(12) United States Patent
Lu

(10) Patent No.: US 11,405,753 B2
(45) Date of Patent: Aug. 2, 2022

(54) INTEGRATED ESTIMATION OF THE LOCATION OF A PLURALITY OF REFERENCE RADIOS

(71) Applicant: Polaris Wireless, Inc., Mountain View, CA (US)

(72) Inventor: Jonathan Shiao-en Lu, Cupertino, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 155 days.

(21) Appl. No.: 16/939,043

(22) Filed: Jul. 26, 2020

(65) Prior Publication Data

US 2021/0029503 A1 Jan. 28, 2021

Related U.S. Application Data

(60) Provisional application No. 62/885,343, filed on Aug. 12, 2019, provisional application No. 62/879,527, filed on Jul. 28, 2019.

(51) Int. Cl.
*H04W 4/029* (2018.01)
*H04W 24/10* (2009.01)
(Continued)

(52) U.S. Cl.
CPC ............. *H04W 4/029* (2018.02); *G01S 5/012* (2020.05); *G01S 5/0284* (2013.01);
(Continued)

(58) Field of Classification Search
CPC ..... H04W 4/029; H04W 4/023; H04W 24/10; H04W 48/16; H04W 52/242;
(Continued)

(56) References Cited

U.S. PATENT DOCUMENTS 5,390,339 A 2/1995 Bruckert et al.
5,574,466 A 11/1996 Reed et al.
(Continued)

OTHER PUBLICATIONS

USPTO, Office Action, U.S. Appl. No. 16/939,039, dated Dec. 21, 2021.
(Continued)

*Primary Examiner* — Dai Phuong
(74) *Attorney, Agent, or Firm* — McGeary Cukor LLC; Jason Paul DeMont; Kenneth Ottesen

(57) ABSTRACT

A location engine uses the empirical measurements made by a scouting wireless terminal (i) to discover the existence of a reference radio within a geographic region; (ii) to generate an estimate of the location of the newly-discovered reference radio, and (iii) to generate an estimate of the transmission power of the downlink control channel radio signal transmitted by the newly-discovered reference radio. The location engine then uses: (i) the estimate of the location of the newly-discovered reference radio, and (ii) the estimate of the transmission power of the downlink control channel radio signal transmitted by the newly-discovered reference radio, and (iii) measurements, made by a user wireless terminal, of the power of each of the downlink control channel radio signals transmitted by each of the reference radios to generate an estimate of the location of the user wireless terminal.

18 Claims, 15 Drawing Sheets

(51) Int. Cl.

| | | |
|---|---|---|
| *G01S 5/02* | (2010.01) | |
| *H04B 17/318* | (2015.01) | |
| *H04W 52/24* | (2009.01) | |
| *H04W 64/00* | (2009.01) | |
| *G01S 11/06* | (2006.01) | |
| *G01S 5/00* | (2006.01) | |
| *H04W 4/02* | (2018.01) | |
| *H04W 48/16* | (2009.01) | |

(52) U.S. Cl.
CPC .......... *G01S 5/02521* (2020.05); *G01S 11/06* (2013.01); *H04B 17/318* (2015.01); *H04W 4/023* (2013.01); *H04W 24/10* (2013.01); *H04W 48/16* (2013.01); *H04W 52/242* (2013.01); *H04W 64/003* (2013.01)

(58) Field of Classification Search
CPC .... H04W 64/003; H04B 17/318; G01S 5/012; G01S 5/02521; G01S 5/0284; G01S 11/06
See application file for complete search history.

(56) References Cited

U.S. PATENT DOCUMENTS

| | | | |
|---|---|---|---|
| 6,097,336 A | 8/2000 | Stilp | |
| 6,236,365 B1 | 5/2001 | LeBlanc et al. | |
| 7,116,987 B2 | 10/2006 | Spain, Jr. et al. | |
| 8,712,428 B2 | 4/2014 | Spain | |
| 9,078,229 B1 | 7/2015 | Vannucci et al. | |
| 9,462,559 B2* | 10/2016 | Shen | H04W 52/38 |
| 9,743,254 B2* | 8/2017 | Friday | H04B 17/373 |
| 2001/0022558 A1 | 9/2001 | Karr, Jr. et al. | |
| 2002/0039904 A1 | 4/2002 | Anderson | |
| 2002/0186167 A1 | 12/2002 | Anderson | |
| 2003/0017832 A1 | 1/2003 | Anderson et al. | |
| 2003/0222819 A1 | 12/2003 | Karr et al. | |
| 2005/0179591 A1 | 8/2005 | Bertoni et al. | |
| 2006/0025158 A1 | 2/2006 | Leblanc et al. | |
| 2006/0075131 A1* | 4/2006 | Douglas | H04W 64/00 709/230 |
| 2006/0199546 A1* | 9/2006 | Durgin | H04B 17/318 455/67.11 |
| 2008/0113672 A1 | 5/2008 | Karr et al. | |
| 2010/0207820 A1 | 8/2010 | Kawano et al. | |
| 2011/0221635 A1 | 9/2011 | Wang | |
| 2011/0287778 A1 | 11/2011 | Levin et al. | |
| 2011/0287784 A1 | 11/2011 | Levin et al. | |
| 2011/0287801 A1 | 11/2011 | Levin et al. | |
| 2013/0027251 A1* | 1/2013 | Lu | G01S 3/34 342/451 |
| 2013/0260782 A1 | 10/2013 | Un et al. | |
| 2015/0029869 A1 | 1/2015 | Wolcott et al. | |
| 2016/0037305 A1 | 2/2016 | Pan et al. | |
| 2016/0381591 A1* | 12/2016 | Lysejko | G01S 3/043 370/252 |
| 2020/0322894 A1* | 10/2020 | Xu | H04L 5/0091 |
| 2021/0320824 A9* | 10/2021 | Ghosh | H04L 1/0026 |

OTHER PUBLICATIONS

USPTO, Office Action, U.S. Appl. No. 16/939,041, dated Dec. 21, 2021.
USPTO, Office Action, U.S. Appl. No. 16/939,042, dated Dec. 21, 2021.
USPTO, Office Action, U.S. Appl. No. 16/939,044, dated Nov. 23, 2021.
USPTO, Office Action, U.S. Appl. No. 16/939,040, dated Oct. 18, 2021.
USPTO, Office Action, U.S. Appl. No. 16/939,039, dated May 26, 2021.
USPTO, Office Action, U.S. Appl. No. 16/939,040, dated Jul. 7, 2021.
USPTO, Office Action, U.S. Appl. No. 16/939,041, dated May 26, 2021.
USPTO, Office Action, U.S. Appl. No. 16/939,042, dated Jun. 9, 2021.
S. Fernandez, "X-Ray Eyes in the Sky—UCSB researchers have a proposed a new method for 3D through-wall imaging that utilizes drones and WiFi," The UC Santa Barbara Current, Jun. 19, 2017.
Rodriguez Larrad, I., Nguyen, H. C., Kovács, I. Z., Sørensen, T. B., & Mogensen, P. E. (2017). An Empirical Outdoor-to-Indoor Path Loss Model from below 6 GHz to cm-Wave Frequency Bands. I E E E Antennas and Wireless Propagation Letters, 16, 1329-1332. https://doi.org/10.1109/LAWP.2016.2633787.
Robert Wilson, "Propagation Losses Through Common Building Materials, 2.4 GHz v 5 GHz," Magis Networks, Inc., E10589, Aug. 2002.
USPTO, Notice of Allowance, U.S. Appl. No. 16/939,040, dated Mar. 9, 2022.
USPTO, Notice of Allowance, U.S. Appl. No. 16/939,044, dated Mar. 16, 2022.
USPTO, Notice of Allowance, U.S. Appl. No. 16/939,043, dated Mar. 7, 2022.

* cited by examiner

Map of Portion of Geographic Region 101 Depicting the Simulated Values of PV(k) for All K = 49 Partitions (After Task 605 is Performed)

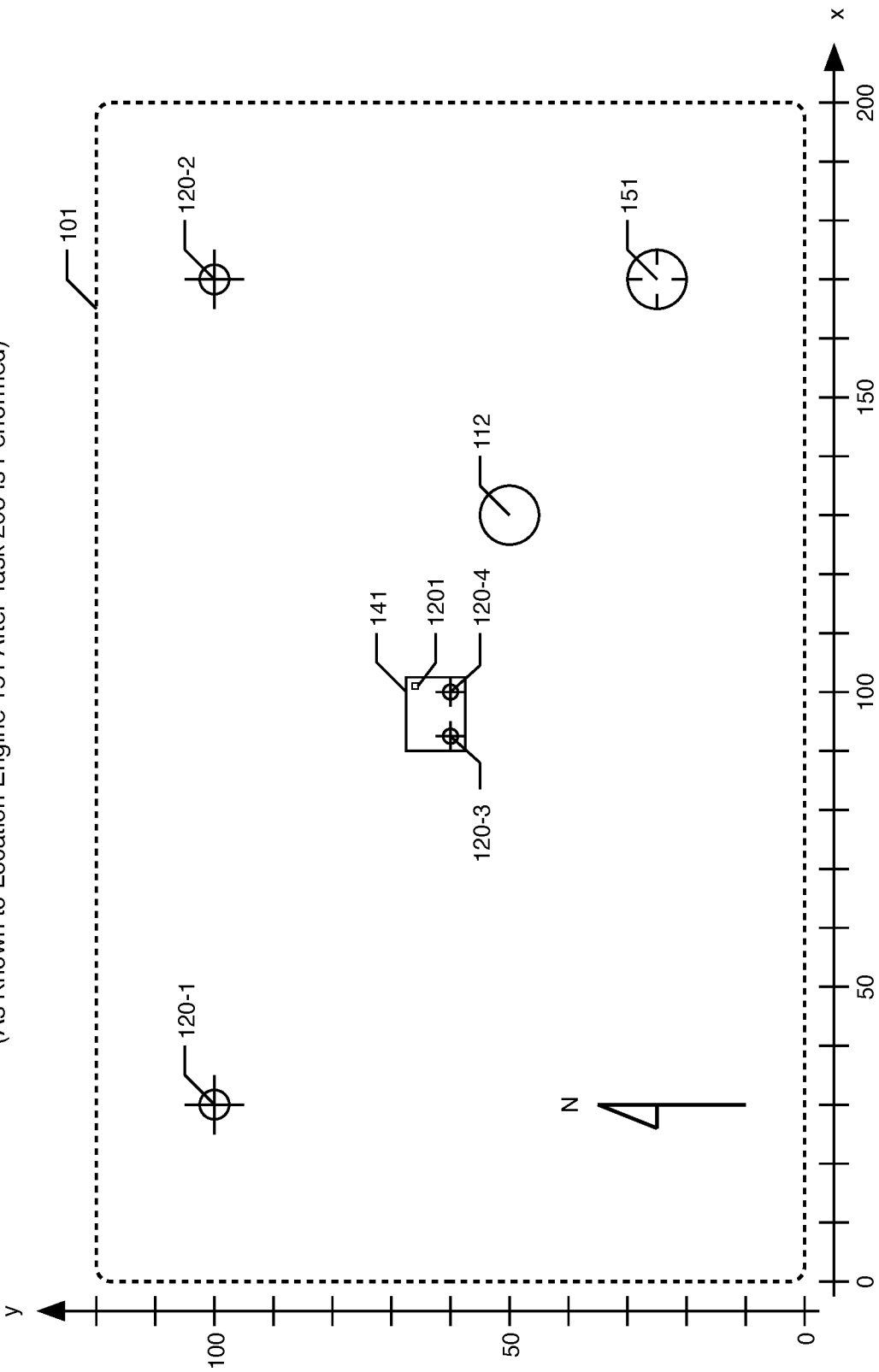

INTEGRATED ESTIMATION OF THE LOCATION OF A PLURALITY OF REFERENCE RADIOS

CROSS-REFERENCE TO RELATED APPLICATIONS

This application claims the benefit of:
(i) U.S. Patent Application 62/879,527, entitled "Estimating the Location of a Reference Radio in a Geographic Region and Using the Estimated Location of the Reference Radio to Estimate the Location of a Wireless Terminal," filed on Jul. 28, 2019, which is incorporated by reference; and
(ii) U.S. Patent Application 62/885,343, entitled "Estimating the Location of a Reference Radio in a Geographic Region and Using the Estimated Location of the Reference Radio to Estimate the Location of a Wireless Terminal," filed on Aug. 12, 2019, which is incorporated by reference.
This application is related to:
(i) U.S. patent application Ser. No. 16/939,039, entitled "Estimating the Location of a Reference Radio and Using the Estimated Location of the Reference Radio to Estimate the Location of a Wireless Terminal", filed on Jul. 26, 2020, which is incorporated by reference; and
(ii) U.S. patent application Ser. No. 16/939,040, entitled "Estimating the Excess Path Loss Inside of a Building and Using the Estimates of Excess Path Loss to Estimate the Location of a Wireless Terminal", filed on Jul. 26, 2020, which is incorporated by reference; and
(iii) U.S. patent application Ser. No. 16/939,041, entitled "Estimating the Location of a Footprint of Building and Using the Footprint to Estimate the Location of a Wireless Terminal", filed on Jul. 26, 2020, which is incorporated by reference; and
(iv) U.S. patent application Ser. No. 16/939,042, entitled "Estimating the Location of a Reference Radio Based on the Signals Transmitted by a Multi-Band Radio Transmitter", filed on Jul. 26, 2020, which is incorporated by reference; and
(v) U.S. patent application Ser. No. 16/939,044, entitled "Estimating the Location of a Reference Radio in a Multi-Story Building and Using the Estimated Location of the Reference Radio to Estimate the Location of a Wireless Terminal", filed on Jul. 26, 2020, which is incorporated by reference.
If there is any inconsistency between the language in one or more of these applications and this specification, the language in this specification prevails for the purposes of interpreting this specification.

FIELD OF THE INVENTION

The present invention relates to telecommunications in general and, more particularly, to a method of using radio signals to generate an estimate of the location of a wireless terminal.

BACKGROUND OF THE INVENTION

Wireless telecommunications (e.g., cellular, WiFi, Bluetooth, etc.) are a staple for the communication of voice, text, video, and multimedia. The salient advantage of wireless telecommunications over wireline telecommunications is that wireless telecommunications affords mobility to the user. On the other hand, the mobility is a double-edge sword in that it is a disadvantage to any entity that has a legitimate interest in being able to quickly and accurately ascertain the location of the wireless terminal or its user.

Such interested entities can include:
(i) the wireless terminal itself, or
(ii) the user of the wireless terminal, or
(iii) a remote person, remote terminal, or a remote data processing system.

There are a variety of reasons why the wireless terminal itself might be interested in knowing its own location. For example, the wireless terminal might comprise a navigation application that provides its user with driving directions. If the wireless terminal was not able to ascertain its own location, it could not know how to navigate to another location.

There are a variety of reasons why the user of the wireless terminal might be interested in knowing his or her own location. For example, the user might want to record the latitude and longitude of his or her location for future reference. Or the user might want to tell a friend where he or she is.

And finally, there are a variety of reasons why a remote entity, a remote terminal, or a remote data processing system might be interested in knowing the location of the wireless terminal (and/or its associated user). For example, the police who receive a 9-1-1 emergency call are interested in knowing the location of the wireless terminal so that they can dispatch first responders to the scene.

The hardware and software that generates an estimate of the location of a wireless terminal is known as a "location engine." The hardware and software composing the location engine can reside:
(i) entirely within the wireless terminal, or
(ii) entirely outside the wireless terminal in a remote terminal, server, or data processing system, or
(iii) partially within the wireless terminal and partially within one or more remote terminals, one or more servers, or data processing systems.

An automobile GPS receiver is a well-known example of a wireless terminal whose location engine resides entirely within the wireless terminal.

As a radio signal propagates through space, some traits of the signal are the same at each point in space (e.g., the frequency of the radio signal, etc.). These are the location-independent traits of a radio signal. In contrast, some traits of the radio signal do vary at each point in space (e.g., the signal strength of the radio signal, the delay spread of the radio signal, etc.). These are the location-dependent traits of the signal. Typically, the location-dependent traits of a signal vary, for example, based on:
(i) the distance from the transmitter to the point, and
(ii) the direction from the transmitter to the point (with respect to the transmitter's antenna pattern), and
(iii) the radio-frequency environment in the regions of space in the vicinity of the point, the transmitter, and the path from the transmitter to the point.

There are four general techniques in the prior art for estimating the location of a wireless terminal based on the measurement of one or more location-dependent traits of one or more reference radio signals that are transmitted between the wireless terminal and one or more reference radios. The four techniques are:
(i) radio-signal identification,
(ii) radio-signal direction finding,
(iii) radio-signal range finding, and
(iv) radio-signal pattern matching.

Each will be described in turn.

Radio-Signal Identification—As a matter of physics, the locally-averaged signal strength (hereinafter "power") of a radio signal decreases as the distance from the transmitter increases. When the radio-frequency environment is free of radio-frequency obstacles, the decrease is smooth. In contrast, when the radio-frequency environment comprises radio-frequency obstacles, the power generally—but not always—decreases as the distance from the transmitter increases. In either case, if a radio signal is transmitted at a first power and is received at or above a second power, then it can be logically deduced that the transmitter is within a fixed distance of the receiver. This technique, and variations on it, are sometimes colloquially called "cell ID," "ECID," and "enhanced cell ID."

Radio-signal identification can be used to estimate the location of a cell phone at an unknown location in, for example, the following manner. A downlink radio signal at a first power is transmitted from a cell tower (i.e., a reference radio), which is at a known location. If the cell phone (i.e., the wireless terminal) can receive the downlink signal at or above a second power, then it can be logically deduced that the cell phone is within a fixed distance of the cell tower.

Conversely, if an uplink radio signal at a first power is transmitted by a cell phone at an unknown location and received by a cell tower at a known location at or above a second power, then it can also be logically deduced that the cell phone is within a fixed distance of the cell tower.

Radio-signal identification can also be used to estimate the location of a WiFi-enabled device at an unknown location in, for example, the following manner. A downlink radio signal at a first power is transmitted by a WiFi Access Point (i.e., a reference radio), which is at a known location. If a WiFi-enabled device (i.e., the wireless terminal) can receive the downlink signal at or above a second power, then it can be logically deduced that the WiFi-enabled device is within a fixed distance of the WiFi Access Point. This is one technique that Apple and Google use to locate devices—such as notebook computers and iPads—that do not comprise GPS receivers or cellular radios.

Conversely, if an uplink radio signal is transmitted by a WiFi-enabled device at an unknown location and received by a WiFi Access Point at a known location, then it can be logically deduced that the that the WiFi-enabled device is within a fixed distance of the WiFi Access Point.

There are numerous tricks that can be made to the basic radio-signal identification to improve the accuracy of the estimate for the location, and numerous companies like Ericsson, Qualcomm, Apple, and Google each tout their own flavor. The principal advantage of radio-signal identification is that it is computationally simple. The principal disadvantage of radio-signal identification is that its results are insufficiently accurate for many applications.

Radio-Signal Direction Finding—Radio signals propagate in a vacuum in a straight line in the absence gravitational effects. This observation can be used to estimate the location of a cell phone at an unknown location in, for example, the following manner. If the cell phone (i.e., the wireless terminal) transmits an uplink radio signal and two or more cell towers (i.e., reference radios) can determine the direction from which the uplink signal arrives, then the location of the cell phone can be estimated using triangulation.

Conversely, if the three or more cell towers (i.e., reference radios) at known locations each transmit a downlink radio signal and the cell phone can determine the direction from which each downlink signal arrives, then the location of the cell phone can be estimated using triangulation.

Radio-signal direction finding can also be used in an analogous manner to estimate the location of a WiFi-enabled device at an unknown location, but radio-signal direction finding is not often used to locate WiFi-enabled devices because real-world radio-frequency environments are usually full of radio-frequency obstacles that render the technique insufficiently accurate for many applications.

Radio-Signal Range Finding—The speed with which radio signals propagate is well known in the prior art. This observation can be used to estimate the location of a cell phone at an unknown location in, for example, the following manner. If three or more cell towers (i.e., reference radios) at known locations each transmit a downlink radio signal to the cell phone (i.e., the wireless terminal) and the cell phone can determine how long it took for each downlink signal to reach the cell phone—and thus the distance or range of the cell phone from each cell tower—then the location of the cell phone can be estimated using trilateration.

Conversely, if the cell phone transmits an uplink signal to three or more cell towers and the cell towers can determine how long it took for the uplink signal to reach the towers, then the location of the cell phone can be estimated using trilateration.

Radio-signal range finding can also be used in an analogous manner to estimate the location of a WiFi-enabled device at an unknown location.

Radio-Signal Pattern Matching—Downlink radio signals from many types of transmitters (e.g., television, commercial radio, downlink satellite, cellular telephone, WiFi, etc.) permeate our environment, and each location in space is associated with a unique combination of the location-dependent traits of those signals. This enables a map or database to be created that correlates the location-dependent traits of the downlink signals to location. Common names for this family of techniques include "Wireless Location Signatures," "RF Pattern Matching," and "RF Fingerprinting."

Radio-signal pattern matching can be used, for example, to estimate the location of a cell phone at an unknown location. The cell phone (i.e., the wireless terminal) observes the downlink signals it can receive that are transmitted from the cell towers (i.e., reference radios) at known locations and measures the location-dependent traits of those signals. Then the location of the cell phone can be estimated by pattern matching the measured values of the location-dependent traits of the observed downlink signals against the map. The location on the map whose expected or predicted values of the location-dependent traits that best matches the observed measurements is the estimate of the location of the wireless terminal.

Conversely, if the three or more cell towers can observe and measure the location-dependent traits of a signal transmitted by the cell phone, then the location of the cell phone can be estimated by pattern matching the measured values of the location-dependent traits of the observed uplink signal against a map that correlates the location-dependent traits of the uplink signal to location.

Radio-signal pattern matching can also be used, for example, in an analogous manner to estimate the location of a WiFi-enabled device at an unknown location.

SUMMARY OF THE INVENTION

The illustrative embodiment of the present invention is a method for estimating the location of a wireless terminal without some of the costs and disadvantages for doing so in the prior art.

The task of estimating the location of a wireless terminal is performed by determining the spatial relationship of the wireless terminal to one or more reference radios. By analyzing the location-dependent traits of the radio signals that are exchanged by the wireless terminal and the reference radio, a location engine can determine the location of the wireless terminal relative to the reference radio(s). The accuracy of the estimate of the location of the wireless terminal is dependent on the accuracy with which the location of the reference radio(s) is known or estimated.

If the wireless terminal cannot transmit a signal to a reference radio and cannot receive a signal from a reference radio, or the location engine does not possess a confirmed or estimated location for the reference radio, then the location engine has no touchstone on which to base the location of the wireless terminal. Therefore, it is advantageous for the location engine to know:

(i) the existence of as many reference radios as possible, and (ii) the confirmed or estimated location of each reference radio, and (iii) the transmission parameters of each signal transmitted by each radio, and (iv) as much as possible about presence or absence of radio-frequency (RF) obstacles in the vicinity of each reference radio.

This information is, however, not always readily available.

The existence, location, and transmission parameters of almost all broadcast, navigation, and high-power telecommunications radios is a matter of public record and easily provided to a location engine. In contrast, the existence, location, and transmission parameters of most low-power/short-range radios are not. The low-power/short-range radios—such as, for example and without limitation, the WiFi base stations and WiFi-enabled devices in office buildings, stores, restaurants, hotels, etc. are, collectively, ideal as reference radios because of their ubiquity and short-range transmission range.

In the prior art, the process of learning the location and transmission parameters of these radios involves the physical and administrative inspection of each radio. Alternatively, crude estimates of the location of each radio can be obtained by drive testing—such as that performed by Google and Apple—past the buildings where such radios are located, but accurate estimates of the transmission parameters cannot be generated without information about the presence or absence of RF obstacles in the vicinity.

One project in the prior art uses a method that is analogous to tomography. The project attempts to gain information about the presence or absence of RF obstacles by flying a pair of radio-equipped aerial drones in an area of interest (e.g., around a building, for example, etc.). One drone transmits a signal at a known power from a known location and the other drone, also at a known location, measures the power of the received signal. Because the location of both drones is known, the distance between the drones can be calculated. Because the distance between the drones can be calculated, the free-space path loss of the signal from between the two drones can also be calculated. Therefore, any additional path loss can be attributed to one or more RF obstacles along the line between the two drones. By taking lots of such measurements and using the principles of tomography, estimates of the presence and absence of RF obstacles in the region of interest can be generated.

In contrast and in accordance with the illustrative embodiment, a single wireless terminal—hereinafter called a "scouting wireless terminal"—makes power measurements of a signal transmitted by a potential reference radio—whose location is unknown—at a plurality of locations. The illustrative embodiment is able to use those measurements—and knowledge of the location at which they were made—to generate:

(i) an estimate of the location of the newly-discovered reference radio, which might be inside or outside of the building, and (ii) an estimate of the transmission power of the radio signal transmitted by the newly-discovered reference radio, and (iii) a quantitative estimate of the RF obstacles in the vicinity of the radio, and (iv) an estimate of whether a building exists in the vicinity of the radio by examining the spatial distribution of RF obstacles, and, if so, an estimate of the location of the footprint of the building, and (v) an estimate of the excess path loss for at least a portion of the building, if the building is estimated to exist, and (vi) an estimate of the nature and location of one or more architectural features (e.g., an auditorium, a bank of elevators, a vault, a collection of cubicles, a ballroom, a stairwell, etc.) of the building, if the building is estimated to exist.

And all of this can be generated based on a plurality of power measurements of signals transmitted from a radio at an unknown location within a building that is also at an unknown location, by a single scouting wireless terminal, that is outside of the building. This information is then available to the location engine for estimating the location of a wireless terminal.

BRIEF DESCRIPTION OF THE DRAWINGS

FIG. 15 depicts a map of geographic region 101 as known to location engine 151 after task 203 is performed.

DEFINITIONS

Figure 1:
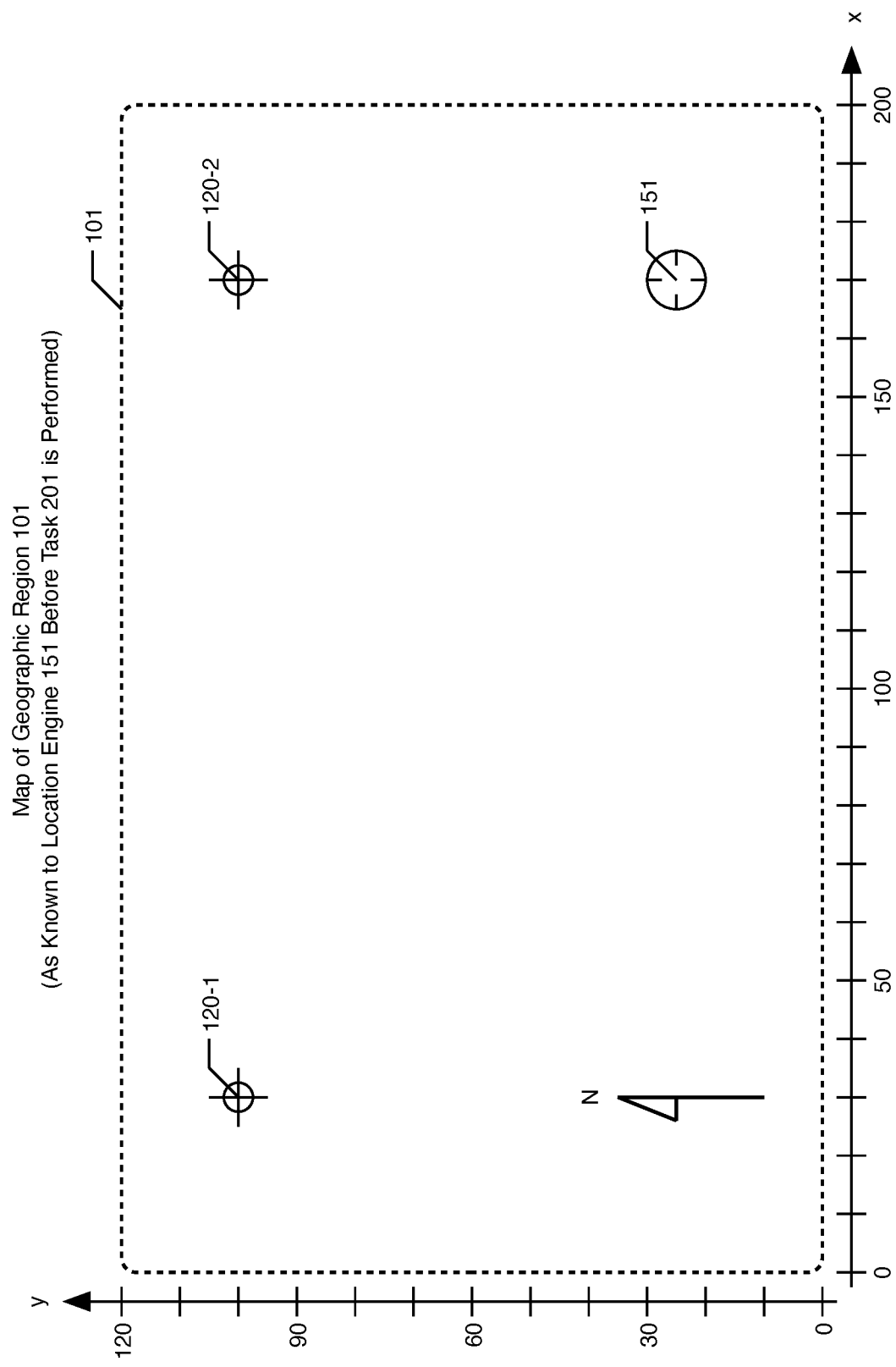
FIG. 1 depicts a map of geographic region 101 as known to location engine 151 before task 201 is performed.

[so] Architectural Feature—For the purposes of this specification, an "architectural feature" is defined as an aspect of a building that is:
(i) a volume of space that constitutes the presence of a substantial radio-frequency (RF) obstacle (e.g., a boiler, a vault, a stairwell, an elevator shaft, etc.), or
(ii) a volume of space that constitutes the absence of a substantial radio-frequency (RF) obstacle (e.g., an auditorium, a ballroom, a collection of cubicles, etc.).
The likelihood of a wireless terminal being located at or near an architectural feature can be high or low or neutral depending, for example and without limitation, on the time of day, the day of the week, the day of the year, the nature of the feature, and the existence and proximity of other features.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Building—For the purposes of this specification, a "building" is defined as a man-made structure, regardless of whether it is intended to be inhabited (e.g., a house, an office building, etc.) or not inhabited (e.g., a radio tower, an oil tank, etc.).

Excess Path Loss—For the purposes of this specification, the "excess path loss" is defined as the attenuation experienced by a hypothetical radio signal—in excess of the free-space path loss—as it propagates through a non-vacuum medium in a straight line from Point A to Point B.

Free-Space Path Loss—For the purposes of this specification, the "free-space path loss" is defined as the attenuation experienced by a hypothetical radio signal as it propagates through a vacuum in a straight line from Point A to Point B.

Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Identity of a Radio Signal—For the purposes of this specification, the phrase "identity of a radio signal" is defined as one or more indicia that distinguish one radio signal from another radio signal.

Location—For the purposes of this specification, the term "location" is defined as a zero-dimensional point, a finite one-dimensional path segment, a finite two-dimensional surface area, or a finite three-dimensional volume.

Location-Dependent Information—For the purposes of this specification, the term "location-dependent information" is defined as information that varies with location. For example and without limitation, location-dependent information can be:
(i) a measurement of a location-dependent trait (e.g., signal strength, etc.) of a radio signal as received by the wireless terminal,
(ii) the identity of a radio signal as received by the wireless terminal (e.g., in a service environment in which different radio signals transmitted from different locations are assigned different identities, etc.), or
(iii) the identity (e.g., service set identifier [SSID], media access control [MAC] address, etc.) of the base station in communication with the wireless terminal (e.g., in a service environment in which different base stations at different locations are assigned different identities, etc.).

Location-Dependent Trait of a Radio Signal—For the purposes of this specification, the term "location-dependent trait of a radio signal" is defined as a characteristic of a radio signal that varies with:
(i) the location of the transmitter of the signal, or
(ii) the location of the receiver of the signal, or
(iii) both i and ii.
For example and without limitation, the amplitude and phase of a radio signal are generally location-dependent traits of the signal. In contrast, the frequency of a given radio signal is generally not a location-dependent trait of the signal.

Location-Trait Database—For the purposes of this specification, a "Location-Trait Database" is defined as a mapping that associates:
(i) one or more location-dependent traits of one or more radio signals received or transmitted by a wireless terminal, or
(ii) the identity of one or more radio signals received or transmitted by a wireless terminal, or
(iii) both i and ii,
at each of a plurality of locations.

Partition—For the purposes of this specification, a "partition" is defined as a volume of space that is deemed to have a uniform excess path loss per meter for a signal characterized by a wavelength.

Processor—For the purposes of this specification, a "processor" is defined as hardware or hardware and software that performs mathematical and/or logical operations.

Power—For the purposes of this specification, the "power" of a radio signal is defined as the locally-averaged signal strength of the radio signal.

Radio—For the purposes of this specification, a "radio" is defined as hardware or hardware and software that is capable of telecommunications via an unguided (i.e., wireless) radio signal of frequency less than 600 GHz.

Radio-Frequency Environment—For the purposes of this specification the term "radio-frequency environment" is defined as a quantitative characterization of the nature and location of the radio-frequency obstacles in the vicinity of the reference radio, the wireless terminal, and the signal path between the reference radio and the wireless terminal.

Radio-Frequency Obstacle—For the purposes of this specification the term "radio-frequency obstacle" is defined as matter that can refract, diffract, reflect, or absorb a radio signal used in telecommunications.

Reasonable Estimate—For the purposes of this specification, the term "reasonable estimate" and its inflected forms is defined as an estimate that is based on empirical data and logic. A reasonable estimate is not necessarily correct, but it is not a blind guess.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Total Path Loss—For the purposes of this specification, the "total path loss" is defined as the sum of the free-space path loss plus the excess path loss, if any, experienced by a hypothetical radio signal as it propagates in a straight line from Point A to Point B.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Wireless terminal—For the purposes of this specification, the term "wireless terminal" is defined as a device that is capable of telecommunications without a wire or tangible medium. A wireless terminal can be mobile or immobile. A wireless terminal can transmit or receive or transmit and receive.

DETAILED DESCRIPTION

FIG. 1 depicts a map of geographic region 101 as known to location engine 151 before task 201 is performed. Geographic region 101 comprises: scouting wireless terminal 111 (not depicted in FIG. 1), user wireless terminal 112 (not depicted in FIG. 1), reference radio 120-1, reference radio 120-2, reference radio 120-3 (not depicted in FIG. 1), reference radio 120-4 (not depicted in FIG. 1), building 141 (not depicted in FIG. 1), and location engine 151.

Reference radio 120-1, reference radio 120-2, reference radio 120-3, reference radio 120-4, building 141, and location engine 151 are immobile. In contrast, scouting wireless terminal 111 and user wireless terminal 112 are mobile.

Before task 201 is performed, location engine 151 comprises:
  (i) a record of the existence of scouting wireless terminal 111, and
  (ii) a record of the existence of user wireless terminal 112, and
  (iii) a record of the existence of reference radio 120-1, and
  (iv) a record of the existence of reference radio 120-2, and
  (v) a record of the existence of location engine 151 (i.e., itself), and
  (vi) a record of the location of reference radio 120-1, and
  (vii) a record of the location of reference radio 120-2, and
  (viii) a record of the location of location engine 151 (i.e., itself), and
  (ix) a record of the transmission parameters of the downlink control channel radio signal transmitted by reference radio 120-1, and
  (x) a record of the transmission parameters of the downlink control channel radio signal transmitted by reference radio 120-2.

Because of (vi), (vii), and (viii), the locations of reference radio 120-1, reference radio 120-2, and location engine 151 are depicted in FIG. 1. It will be clear to those skilled in the art, after reading this disclosure, how to make and use alternative embodiments of the present invention in which the location engine does not comprise (i) or (ii) or (iii) or (iv) or (v) or (vi) or (vii) or (viii) or (ix) or (x) or any combination of (i), (ii), (iii), (iv), (v), (vi), (vii), (viii), (ix), and (x) before task 201 is performed.

Before task 201 is performed, location engine 151 does not comprise:
  (i) a record of the existence of reference radio 120-3, or
  (ii) a record of the existence of reference radio 120-4, or
  (iii) a record of the existence of building 141, or
  (iv) a record of the location of scouting wireless terminal 111, or
  (v) a record of the location of user wireless terminal 112, or
  (vi) a record of the location of reference radio 120-3, or
  (vii) a record of the location of reference radio 120-4, or
  (viii) a record of the location of building 141, or
  (ix) a record of the transmission parameters of the downlink control channel radio signals transmitted by reference radio 120-3, or
  (x) a record of the transmission parameters of the downlink control channel radio signals transmitted by reference radio 120-4, or
  (xi) a record of any architectural features of building 141, or
  (xii) a record of the presence of a radio-frequency (RF) obstacle in geographic region 101, or
  (xiii) a record of an area in geographic region 101 that is known to be devoid of one or more radio-frequency (RF) obstacles in geographic region 101.

Because of (i), (ii), (iii), (iv), (v), (vi), and (vii), scouting wireless terminal 111, user wireless terminal 112, reference radio 120-3, reference radio 120-4, and building 141 are omitted from FIG. 1. It will be clear to those skilled in the art, after reading this disclosure, how to make and use alternative embodiments of the present invention in which location engine 151 comprises (i) or (ii) or (iii) or (iv) or (v) or (vi) or (vii) or (viii) or (ix) or (x) or (xi) or (xii) or (xiii) any combination of (i), (ii), (iii), (iv), (v), (vi), (vii), (viii), (ix), (x), (xi), (xii), or (xiii) before task 201 is performed.

In accordance with the illustrative embodiment, geographic region 101 is approximately rectangular, but it will be clear to those skilled in the art, after reading this disclosure, how to make and use alternative embodiments of the present invention in which the geographic region has any shape (e.g., irregular, oval, triangular, etc.).

In accordance with the illustrative embodiment, geographic region 101 is:
  (i) substantially planar (i.e., absent mountains and deep valleys), and
  (ii) substantially horizontal, and
  (iii) at 1.5 meters above ground level.

In accordance with the illustrative embodiment, scouting wireless terminal 111, user wireless terminal 112, reference radio 120-1, reference radio 120-2, reference radio 120-3, and reference radio 120-4 are all substantially within the plane of geographic region 101. It will be clear to those skilled in the art, after reading this disclosure, how to make and use alternative embodiments of the present invention in which one or more wireless terminals and reference radios are not substantially in the same plane (e.g., one or more of them is on or in a tall building, on a mast, or on a hill, the geographic region is so large that the curvature of the Earth must be considered, etc.).

In accordance with the illustrative embodiment, geographic region 101 spans 200 meters (measured East-West) by 120 meters (measured North-South) and, therefore, comprises 24,000 square meters. It will be clear to those skilled in the art, after reading this disclosure, how to make and use alternative embodiments of the present invention in which the geographic region of interest has any dimensions and encompasses any area (e.g., 10,000 square meters, 50,000 square meters, 100,000 square meters, 500,000 square meters, 1 square kilometer, 100 square kilometers, 10,000 square kilometers, etc.).

Each location in geographic region 101 is designated by a Cartesian coordinate measured in meters from an origin, which is located at the southwest corner of geographic region 101, as shown in FIG. 1. The coordinates of reference radio 120-1 and reference radio 120-2 are listed in Table 1 below:

TABLE 1

Coordinates of Reference Radio 120-1 and Reference Radio 120-2

| Reference Radio | Coordinates |
| --- | --- |
| reference radio 120-1 | (30, 100, 1.5) |
| reference radio 120-2 | (170, 100, 1.5) |

In accordance with the illustrative embodiment, scouting wireless terminal 111 is a standard off-the-shelf commercially-available cellular smartphone (e.g., an Apple iPhone, a Samsung Galaxy, etc.) that is capable of:

(i) being carried to various locations in the vicinity of reference radio 120-3, and (ii) being carried to various locations in the vicinity of reference radio 120-4, and (iii) receiving, decoding, and measuring the power of the 2.4 GHz WiFi downlink control channel radio signal transmitted by reference radio 120-3 at one or more of those locations, and (iv) receiving, decoding, and measuring the power of the 2.4 GHz WiFi downlink control channel radio signal transmitted by reference radio 120-4 at one or more of those locations, and (v) determining its location with GPS at each of those locations, and (vi) transmitting:

(1) the identity of reference radio 120-3, (2) the value of each measurement of the power of the 2.4 GHz WiFi downlink control channel radio signal transmitted by reference radio 120-3, and (3) the coordinates of the location where each measurement of the power of the 2.4 GHz WiFi downlink control channel radio signal transmitted by reference radio 120-3 was made to location engine 151, and (vii) transmitting:

(1) the identity of reference radio 120-4, (2) the value of each measurement of the power of the 2.4 GHz WiFi downlink control channel radio signal transmitted by reference radio 120-4, and (3) the coordinates of the location where each measurement of the power of the 2.4 GHz WiFi downlink control channel radio signal transmitted by reference radio 120-4 was made to location engine 151.

It will be clear to those skilled in the art how to make and use scouting wireless terminal 111.

In accordance with the illustrative embodiment, user wireless terminal 112 is a standard off-the-shelf commercially-available cellular smartphone (e.g., an Apple iPhone, a Samsung Galaxy, etc.) that is capable of:

(i) receiving, decoding, and measuring the power of the 800 MHz downlink control channel radio signal transmitted by reference radio 120-1, and (ii) transmitting the identity of reference radio 120-1 and the value of the measurement to location engine 151, and (iii) receiving, decoding, and measuring the power of the 800 MHz downlink control channel radio signal transmitted by reference radio 120-2, and (iv) transmitting the identity of reference radio 120-2 and the value of the measurement to location engine 151, and (v) receiving, decoding, and measuring the power of the 2.4 GHz downlink control channel radio signal transmitted by reference radio 120-3, and (vi) transmitting the identity of reference radio 120-3 and the value of the measurement to location engine 151, and (vii) receiving, decoding, and measuring the power of the 2.4 GHz downlink control channel radio signal transmitted by reference radio 120-4, and (viii) transmitting the identity of reference radio 120-4 and the value of the measurement to location engine 151, and (ix) receiving an estimate of its location from location engine 151, and (x) running a location-based application (e.g., Facebook, Find My Friends, Weather, etc.) that uses the estimate of its location obtained from location engine 151.

It will be clear to those skilled in the art how to make and use user wireless terminal 112.

In this specification, wireless terminal 111 is prefixed with the term "scouting" solely to emphasize the difference in function it performs in contrast to the functions performed by "user" wireless terminal 112. In accordance with the illustrative embodiment, there is no hardware or software difference between scouting wireless terminal 111 and user wireless terminal 112. Furthermore, it will be clear to those skilled in the art, after reading this disclosure, that in another situation user wireless terminal 112 can and might perform the functions performed herein by scouting wireless terminal 111 and scouting wireless terminal 111 can and might perform the functions performed by user wireless terminal 112.

In accordance with the illustrative embodiment, reference radio 120-1 transmits a downlink control channel radio signal from an omnidirectional antenna at 40 dBm. The downlink control channel radio signal is characterized by a first wavelength $\lambda_1 = c/800$ MHz=0.375 meters. In accordance with the illustrative embodiment, reference radio 120-1 is a cellular base station (e.g., 3G, 4G LTE, 5G NR, etc.), but it will be clear to those skilled in the art, after reading this disclosure, how to make and use alternative embodiments of the present invention in which the reference radio provides any service (e.g., transmit only, transmit and receive, voice, data, video, etc.) and transmits any type of signal as characterized by any wavelength at any transmit power. In accordance with the illustrative embodiment, the transmission parameters of the downlink control channel radio signal are constant. It will be clear to those skilled in the art how to make and use reference radio 120-1.

In accordance with the illustrative embodiment, reference radio 120-2 transmits a downlink control channel radio signal from an omnidirectional antenna at 40 dBm. The downlink control channel radio signal is characterized by the first wavelength $\lambda_1 = c/800$ MHz=0.375 meters. In accordance with the illustrative embodiment, reference radio 120-2 is a cellular base station (e.g., 3G, 4G LTE, 5G NR, etc.), but it will be clear to those skilled in the art, after reading this disclosure, how to make and use alternative embodiments of the present invention in which the reference radio provides any service ((e.g., transmit only, transmit and receive, voice, data, video, etc.) and transmits any type of signal as characterized by any wavelength at any transmit power. In accordance with the illustrative embodiment, the transmission parameters of the downlink control channel radio signal are constant. It will be clear to those skilled in the art how to make and use reference radio 120-2.

In accordance with the illustrative embodiment, reference radio 120-3 transmits a downlink control channel radio signal. The downlink control channel radio signal is characterized by a second wavelength $\lambda_2 = c/2.4$ GHz=0.125 meters. In accordance with the illustrative embodiment, reference radio 120-3 is an 802.11 WiFi access point, but it will be clear to those skilled in the art, after reading this disclosure, how to make and use alternative embodiments of the present invention in which the reference radio provides any service (e.g., transmit only, transmit and receive, voice, data, video, etc.) and transmits any type of signal as characterized by any wavelength at any transmit power. In accordance with the illustrative embodiment, the transmission parameters of the downlink control channel radio signal are constant. It will be clear to those skilled in the art how to make and use reference radio 120-3.

In accordance with the illustrative embodiment, reference radio 120-4 transmits a downlink control channel radio signal. The downlink control channel radio signal is characterized by the second wavelength $\lambda_2 = c/2.4$ GHz=0.125 meters. In accordance with the illustrative embodiment, reference radio 120-4 is an 802.11 WiFi access point, but it will be clear to those skilled in the art, after reading this disclosure, how to make and use alternative embodiments of the present invention in which the reference radio provides any service (e.g., transmit only, transmit and receive, voice, data, video, etc.) and transmits any type of signal as characterized by any wavelength at any transmit power. In accordance with the illustrative embodiment, the transmission parameters of the downlink control channel radio signal are constant. It will be clear to those skilled in the art how to make and use reference radio 120-4.

In accordance with the illustrative embodiment, location engine 151 comprises the hardware and software capable of performing the computational tasks described below and in the accompanying figures. Location engine 151 is connected via the Internet and wireline transmission facilities to reference radio 120-1 and reference radio 120-2.

In accordance with the illustrative embodiment, reference radio 120-3 is behind a secure firewall, and, therefore, location engine 151 does not have direct unrestricted wireline access to reference radio 120-3 or the wireless terminals that have been granted wireless access to reference radio 120-3. In accordance with the illustrative embodiment, reference radio 120-4 is behind a secure firewall, and, therefore, location engine 151 does not have direct unrestricted wireline access to reference radio 120-4 or the wireless terminals that have been granted wireless access to reference radio 120-4. Furthermore, location engine 151 is connected via the Internet and wireless (e.g., cellular, etc.) connectivity to scouting wireless terminal 111 and user wireless terminal 112.

Location engine 151 comprises a location-based application (e.g., iOS's "Find My Friends" app, Android's "Waze" app, iOS's Lyft app etc.) that uses the estimate of the location of user wireless terminal 112 generated in task 203. In accordance with the illustrative embodiment, location engine 151 exists within geographic region 101. It will be clear to those skilled in the art, however, after reading this disclosure, how to make and use alternative embodiments of the present invention in which the location engine exists outside of the geographic region of interest. Furthermore, it will be clear to those skilled in the art, after reading this disclosure, how to make and use alternative embodiments of the present invention in which the functionality performed by location engine 151 is distributed among various geographically-dispersed hardware devices (e.g., is performed by servers in "the Cloud," partially on scouting wireless terminal 111, partially on user wireless terminal 112, etc.).

Figure 2:
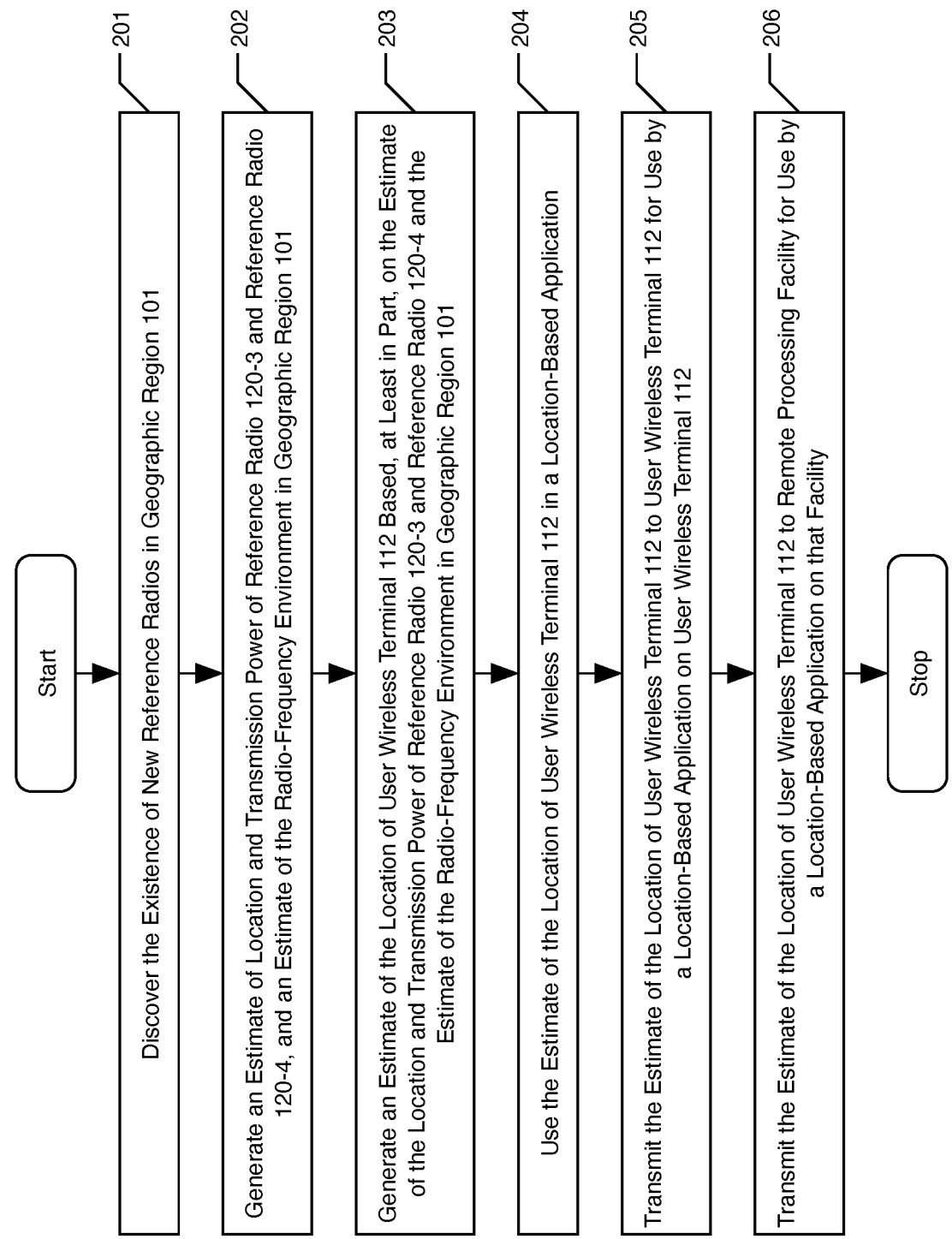
FIG. 2 depicts a flowchart of the tasks performed in accordance with the illustrative embodiment of the present invention.

FIG. 2 depicts a flowchart of the tasks performed in accordance with the illustrative embodiment of the present invention.

At task 201, location engine 151 and scouting wireless terminal 111 cooperate to discover one or more new reference radios in geographic region 101. In accordance with the illustrative embodiment, scouting wireless terminal 111 is carried by a technician whose job it is to systematically patrol geographic region 101 and discover new reference radios. As scouting wireless terminal 111 is carried throughout geographic region 101, it continually scans for 2.4 GHz WiFi downlink control channel radio signals. In accordance with the illustrative embodiment, scouting wireless terminal 111 does not comprise a record of all of the reference radios that are known to location engine 151, but it does comprise a record of all of the reference radios that it has previously received and decoded. Therefore, whenever scouting wireless terminal 111 receives and decodes the 2.4 GHz WiFi downlink control channel radio signal of a reference radio that it has not previously received and decoded, it notifies location engine 151 of that fact.

In accordance with the illustrative embodiment and as part of task 201, scouting wireless terminal 111:

(i) detects the 2.4 GHz WiFi downlink control channel radio signal transmitted by reference radio 120-3 and notifies location engine 151 of that fact, and (ii) detects the 2.4 GHz WiFi downlink control channel radio signal transmitted by reference radio 120-4 and notifies location engine 151 of that fact.

In accordance with the illustrative embodiment, scouting wireless terminal 111 does not discover reference radio 120-3 at the same time or place where it discovers reference radio 120-4. It will be clear to those skilled in the art, after reading this disclosure, how to make and use alternative embodiments of the present invention in which any number of reference radios are discovered at one or more times and one or more places.

In accordance with the illustrative embodiment, in task 201, scouting wireless terminal 111 receives and decodes the 2.4 GHz WiFi downlink control channel radio signal of reference radio 120-3 and the 2.4 GHz WiFi downlink control channel radio signal of reference radio 120-4. Because scouting wireless terminal 111 has not previously received and decoded the downlink control channel radio signal of reference radio 120-3 or reference radio 120-4 before, it notifies location engine 151 that is has received and decoded the signals from reference radio 120-3 and reference radio 120-4. In response, location engine 151 confirms that reference radio 120-3 and reference radio 120-4 are newly-discovered reference radios and directs the technician and scouting wireless terminal 111 to gather power measurements of their signals, as performed in task 202.

At task 202, location engine 151 and scouting wireless terminal 111 cooperate to:
  (i) measure, at multiple locations:
    the power of the 2.4 GHz downlink control channel radio signal that is transmitted by reference radio 120-3, and
    the power of the 2.4 GHz downlink control channel radio signal that is transmitted by reference radio 120-4, and
  (ii) generate an estimate of the location of reference radio 120-3, and
  (iii) generate an estimate of the location of reference radio 120-4, and
  (iv) generate an estimate of the transmission power of the 2.4 GHz downlink control channel radio signal that is transmitted by reference radio 120-3, and
  (v) generate an estimate of the transmission power of the 2.4 GHz downlink control channel radio signal that is transmitted by reference radio 120-4, and
  (vi) generate an estimate of the excess path loss for each of one or more partitions in geographic area 101, and
  (v) generate an estimate of whether a building exists in the area covered by partitions, and, if so, an estimate of the location of the footprint of the building, and
  (vi) generate an estimate of the excess path loss for at least a portion of the building, if the building is estimated to exist, and
  (vii) generate an estimate of the nature and location of one or more architectural features of the building, if the building is estimated to exist.

Task 202 is described in detail below and in the accompanying figures.

At task 203, location engine 151 and user wireless terminal 112 cooperate to generate an estimate of the location of user wireless terminal 112, based, at least in part, on:
  (i) a measurement by user wireless terminal 112 of the power of:
    (1) the 800 MHz downlink control channel radio signal that is transmitted by reference radio 120-1, and
    (2) the 800 MHz downlink control channel radio signal that is transmitted by reference radio 120-2, and
    (3) the 2.4 GHz WiFi downlink control channel radio signal that is transmitted by reference radio 120-3, and
    (4) the 2.4 GHz WiFi downlink control channel radio signal that is transmitted by reference radio 120-4, and
  (ii) the record of:
    (1) the location of reference radio 120-1, and
    (2) the location of reference radio 120-2, and
  (iii) the estimate of:
    (1) the location of reference radio 120-3, and
    (2) the location of reference radio 120-4, and
  (iv) the record of:
    (1) the 800 MHz downlink control channel radio signal that is transmitted by reference radio 120-1, and
    (2) the 800 MHz downlink control channel radio signal that is transmitted by reference radio 120-2, and
  (v) the estimate of:
    (1) the transmission power of the 2.4 GHz WiFi downlink control channel radio signal that is transmitted by reference radio 120-3, and
    (2) the transmission power of the 2.4 GHz WiFi downlink control channel radio signal that is transmitted by reference radio 120-4, and
  (vi) the estimate of the excess path loss for one or more of the partitions of geographic region 101, and
  (vii) the estimate of the existence of the building, and
  (viii) the estimate of the location of the footprint of building, if the building is estimated to exist, and
  (ix) the estimate of the excess path loss for one or more portions of building, if the building is estimated to exist, and
  (x) the estimate of the nature and location of the architectural features of building, if the building is estimated to exist.

It will be clear to those skilled in the art, after reading this disclosure, how to make and use alternative embodiments of the present invention that accomplish task 203 with either (i)(3) or (i)(4) plus any combination of (i)(1), (i)(2), (ii)(1), (ii)(2), (iii)(1), (iii)(2), (iv)(1), (iv)(2), (v)(1), (v)(2), (vi), (vii), (viii), (ix), and (x). Task 203 is described in detail below and in the accompanying figures.

At task 204, location engine 151 uses the estimate of the location of user wireless terminal 112, which was generated in task 203, in a location-based application. It will be clear to those skilled in the art how to make and use embodiments of the present invention that perform task 204.

At task 205, location engine 151 transmits the estimate of the location of user wireless terminal 112, which was generated in task 203, to user wireless terminal 112 for use by a location-based application (e.g., Facebook, Find My Friends, Weather, etc.) on user wireless terminal 112. It will be clear to those skilled in the art how to make and use embodiments of the present invention that perform task 205.

At task 206, location engine 151 transmits the estimate of the location of user wireless terminal 112 to a remote data processing system for use by a location-based application (e.g., E-911, etc.) on that system. It will be clear to those skilled in the art how to make and use embodiments of the present invention that perform task 206.

Figure 3:
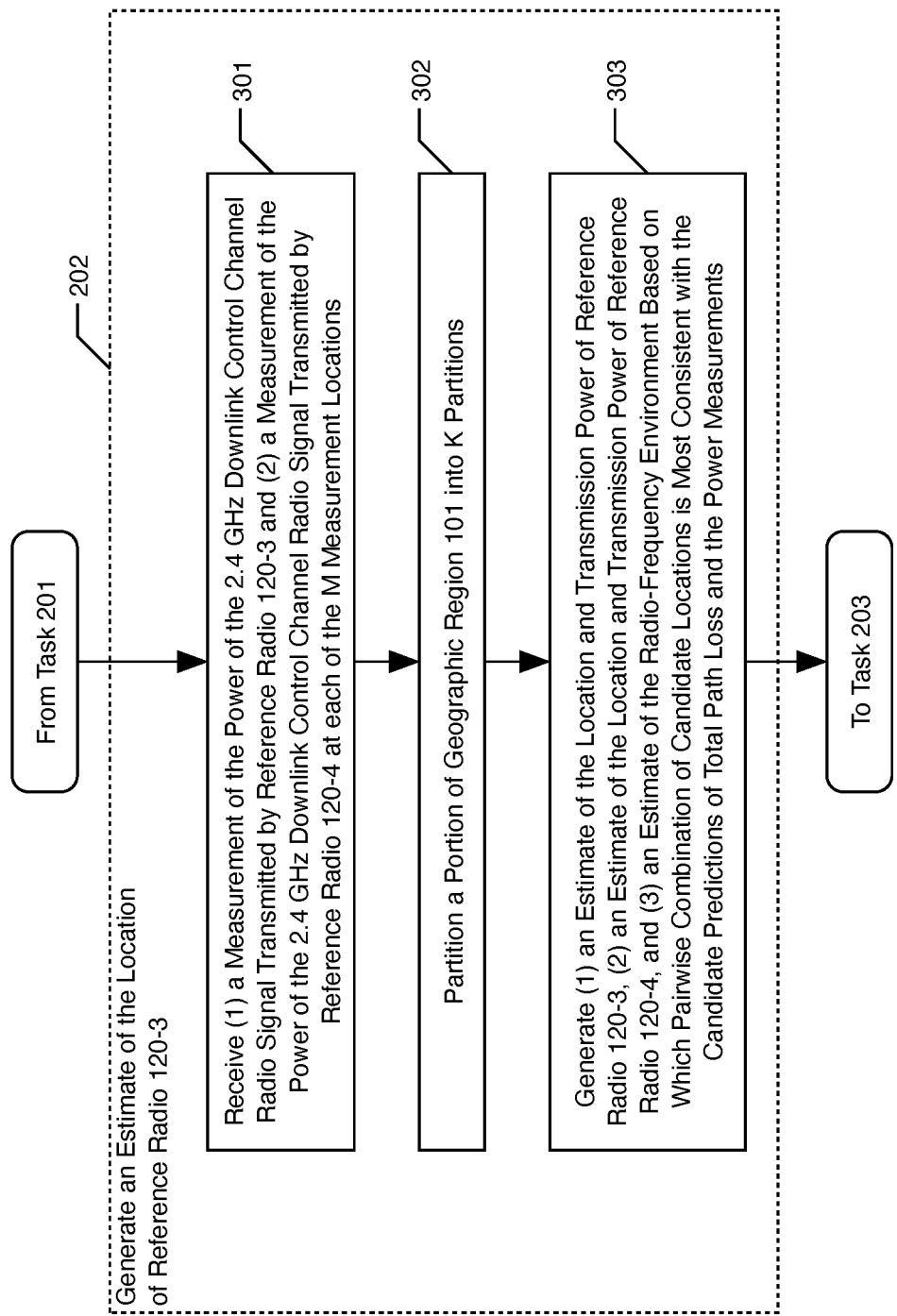
FIG. 3 depicts a flowchart of the subtasks performed in accordance with task 202.

FIG. 3 depicts a flowchart of the subtasks performed in accordance with task 202.

At task 301, scouting wireless terminal 111 makes a measurement of:
  (i) the locally-averaged signal strength (i.e., power) of the 2.4 GHz downlink control channel radio signal transmitted by reference radio 120-3, or
  (ii) the locally-averaged signal strength of the 2.4 GHz downlink control channel radio signal transmitted by reference radio 120-4, or
  (iii) both i and ii
at M measurement locations in geographic region 101. The M measurement locations are designated 1, 2, 3, . . . , m, . . . , M, where M and m are positive integers and m is selected from the set {1, 2, 3, . . . , M}.

In accordance with the illustrative embodiment, a measurement of the 2.4 GHz downlink control channel radio signal transmitted by reference radio 120-3 is made at each of the M measurement locations, but it will be clear to those skilled in the art, after reading this disclosure, how to make and use alternative embodiments of the present invention in which a measurement of a signal is made at fewer than all of the M measurement locations. In accordance with the illustrative embodiment, a measurement of the 2.4 GHz downlink control channel radio signal transmitted by reference radio 120-4 is made at each of the M measurement locations, but it will be clear to those skilled in the art, after reading this disclosure, how to make and use alternative embodiments of the present invention in which a measurement of a signal is made at fewer than all of the M measurement locations.

The value of the mth measurement of the 2.4 GHz downlink control channel radio signal transmitted by reference radio 120-3 is MV(1,m), which is denominated in dBm. The value of the mth measurement of the 2.4 GHz downlink control channel radio signal transmitted by reference radio 120-4 is MV(2,m), which is also denominated in dBm.

The coordinates of the mth measurement location is ML(m), which equals the (x,y,z) coordinates of a location in geographic region 101.

In accordance with the illustrative embodiment, all of the measurements are made in the plane of geographic region 101, which is 1.5 meters above ground level, but it will be clear to those skilled in the art, after reading this disclosure, how to make and use alternative embodiments in which some or all of the measurements are made at above or below ground level.

In accordance with the illustrative embodiment, M=72, but it will be clear to those skilled in the art, after reading this disclosure, how to make and use alternative embodiments of the present invention with any number of measurements.

In accordance with the illustrative embodiment, the technician decides how many measurements locations are chosen (i.e., the value of M), but it will be clear to those skilled in the art, after reading this disclosure, how to make and use alternative embodiments of the present invention in which:
  (i) scouting wireless terminal 111, or
  (ii) location engine 151, or
  (iii) the technician, or
  (iv) any combination of i, ii, and iii
decide how many measurement locations are chosen.

In accordance with the illustrative embodiment, the technician decides the coordinates of each measurement location ML(m), but it will be clear to those skilled in the art, after reading this disclosure, how to make and use alternative embodiments of the present invention in which:
  (i) scouting wireless terminal 111, or
  (ii) location engine 151, or
  (iii) the technician, or
  (iv) any combination of i, ii, and iii
decide the coordinates of each measurement location ML(m).

In accordance with the illustrative embodiment, the technician carries scouting wireless terminal 111 to each measurement location ML(m). When scouting wireless terminal 111 is at measurement location ML(m), scouting wireless terminal 111:
  (i) receives, decodes, and measures the power of the 2.4 GHz WiFi downlink control channel radio signal that is transmitted by reference radio 120-3 to generate measurement MV(1,m), and
  (ii) receives, decodes, and measures the power of the 2.4 GHz WiFi downlink control channel radio signal that is transmitted by reference radio 120-4 to generate measurement MV(2,m), and
  (iii) determines its location ML(m) with GPS, and
  (iv) transmits:
    (1) the identity of reference radio 120-3, and
    (2) the identity of reference radio 120-4, and
    (3) the measurement value MV(1,m) and explicitly indicates that it is associated with reference radio 120-3, and
    (4) the measurement value MV(2,m) and explicitly indicates that it is associated with reference radio 120-4, and, and
    (5) the coordinates of measurement location ML(m)
to location engine 151.

Figure 4:
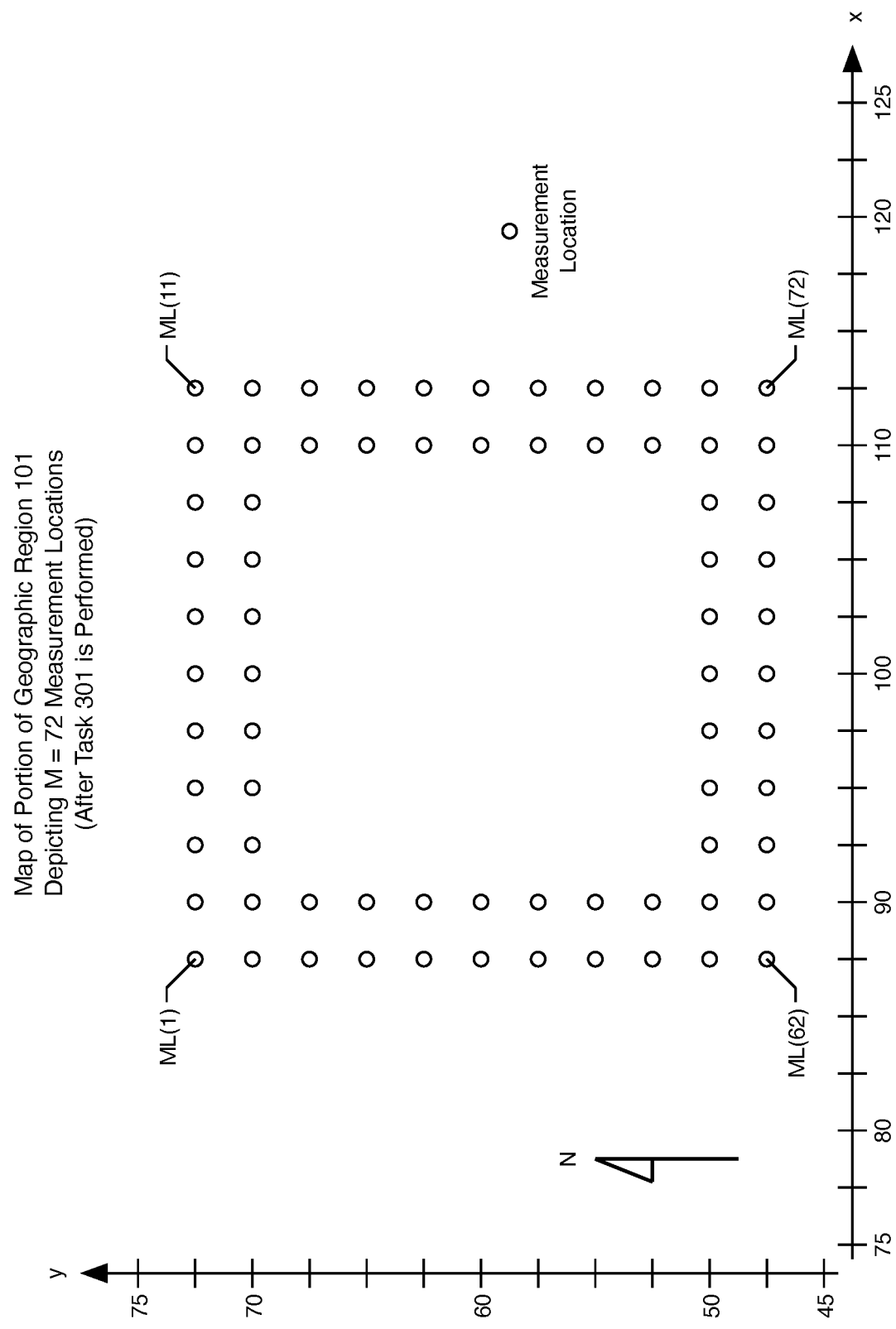
FIG. 4 depicts a map of a portion of geographic region 101 that depicts all M=72 measurement locations (after task 301 is performed).

In accordance with the illustrative embodiment, the M=72 measurement locations ML(1) through ML(M), the M=72 measurement values MV(1,1) through MV(1,M), and the M=72 measurement values MV(2,1) through MV(2,M) are stored in location engine 151. All 72 measurement locations are depicted in FIG. 4 and a sample of them—and their associated measurement values—are listed in Table 2. It will be clear to those skilled in the art how to determine the remaining measurement locations by inspecting FIG. 4.

TABLE 2

List of Measurement Locations and Measurement Values

| m | Measurement Location ML(m) | Measurement Value MV(1, m) | Measurement Value MV(2, m) |
|---|---|---|---|
| 1 | (87.5, 72.5, 1.5) | −65.2 dBm | −70.7 dBm |
| 2 | (90.0, 72.5, 1.5) | −68.2 dBm | −75.0 dBm |
| . | . | . | . |
| . | . | . | . |
| . | . | . | . |
| 35 | (87.5, 60.0, 1.5) | −57.6 dBm | −59.9 dBm |
| 36 | (90.0, 60.0, 1.5) | −56.2 dBm | −58.6 dBm |
| 37 | (110.0, 60.0, 1.5) | −61.5 dBm | −49.0 dBm |
| 38 | (112.5, 60.0, 1.5) | −62.6 dBm | −52.6 dBm |
| . | . | . | . |
| . | . | . | . |
| . | . | . | . |
| 71 | (110.0, 47.5, 1.5) | −71.2 dBm | −63.9 dBm |
| 72 | (112.5, 47.5, 1.5) | −74.0 dBm | −66.8 dBm |

In accordance with the illustrative embodiment, the M measurement locations are spatially diverse. When two measurements are not spatially diverse, they are at least partially redundant and overweight the data from that vicinity.

When the technician has no idea that a reference radio is nearby, the technician can take measurements on a square or hexagonal lattice, while omitting those places where he or she cannot get to because of physical obstacles or legal impediments or logistical efficiency. In contrast, when the technician suspects that he or she knows the location of a newly-discovered reference radio, a good rule of thumb is for the measurement locations to exhibit azimuthal and radial diversity around the suspected location. This can be achieved, for example and without limitation, by circling the suspected location at a few times at different radii (as depicted, for example and without limitation in FIG. 8).

In accordance with the illustrative embodiment, the technician decides that the M measurement locations correspond to those locations in a 2.5 meter by 2.5 meter square lattice at an elevation of 1.5 meters where he or she can gain access. It will be clear to those skilled in the art, after reading this disclosure, how to make and use alternative embodiments of the present invention in which the measurements are made at irregular intervals.

In accordance with the illustrative embodiment, there are some assumptions regarding task 301. For example, it is assumed that:
  (i) the location of reference radio 120-3 does not change during task 301, and
  (ii) the location of reference radio 120-4 does not change during task 301, and
  (iii) the transmission power of the 2.4 GHz downlink control channel radio signal transmitted by reference radio 120-3 does not change during task 301, and
  (iv) the transmission power of the 2.4 GHz downlink control channel radio signal transmitted by reference radio 120-4 does not change during task 301, and
  (v) the antenna gain of reference radio 120-3 is the same in all directions (i.e., reference radio 120-3 comprises an omnidirectional antenna), and (vi) the antenna gain of reference radio 120-4 is the same in all directions (i.e., reference radio 120-4 comprises an omnidirectional antenna), and (vii) the antenna gain of scouting wireless terminal 111 is the same in all directions (i.e., scouting wireless terminal 111 comprises an omnidirectional antenna).

These assumptions might be true or false or partially true, and the degree to which they are true or false will impact the accuracy of the estimates generated by the embodiment of the invention. In any case, it will be clear to those skilled in the art how to perform task 301.

At task 302, location engine 151 partitions the area of interest in geographic region 101 into K partitions. The K partitions are designated 1, 2, 3, . . . , k, . . . , K, where K and k are positive integers and k is selected from the set {1, 2, 3, . . . , K}. In accordance with the illustrative embodiment, a partition is defined as a volume of space that is deemed to have a uniform excess path loss per meter for a given wavelength.

The coordinates of the center of partition k is PL(k), which equals the (x,y,z) coordinates of a location in geographic region 101. The kth partition has a uniform excess path loss per meter for 2.4 GHz signals PV(k), which is denominated in dB per meter.

In accordance with the illustrative embodiment K=49, but it will be clear to those skilled in the art, after reading this disclosure, how to make and use alternative embodiments of the present invention with any number of partitions.

Figure 5:
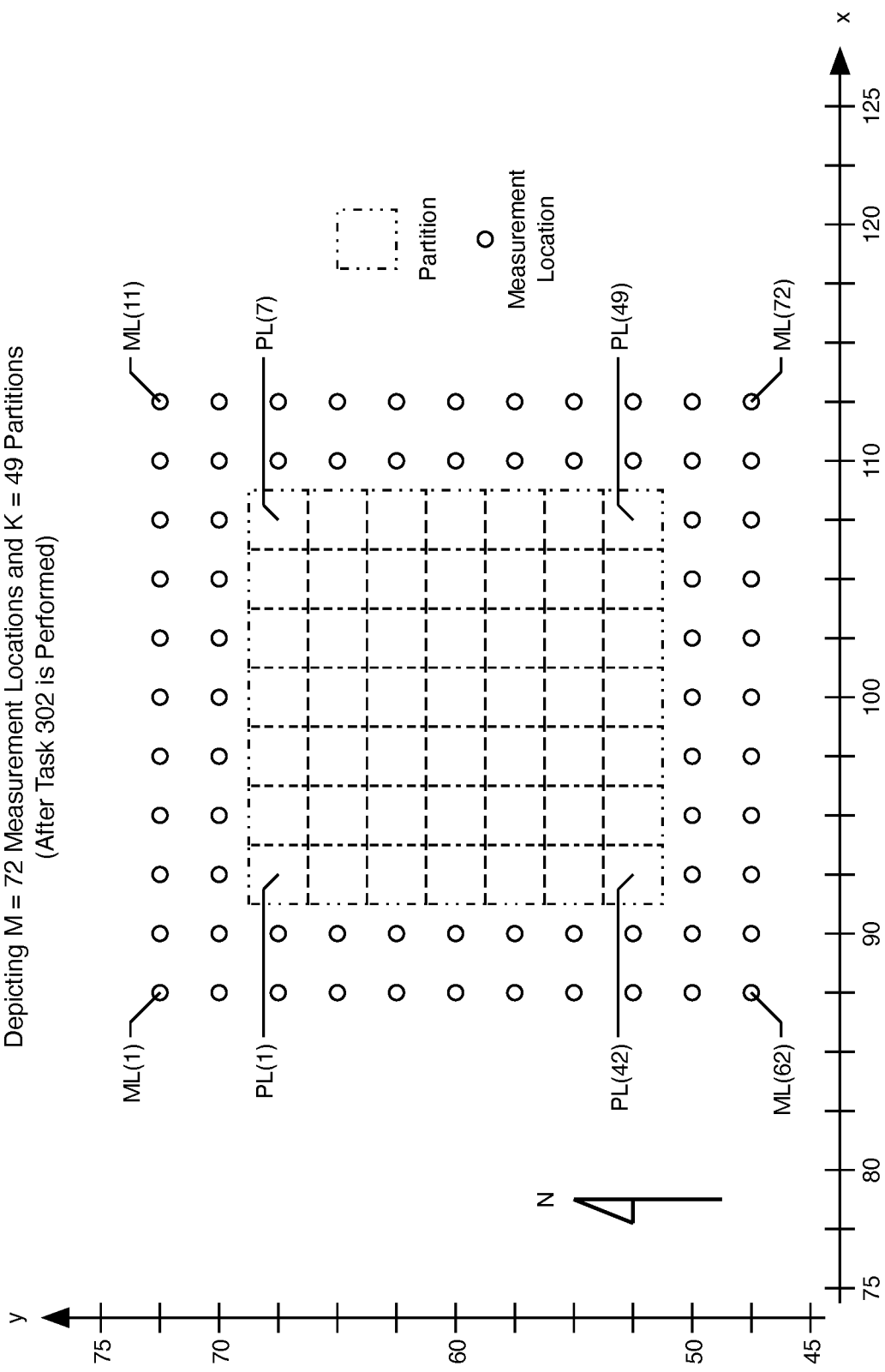
FIG. 5 depicts a map of a portion of geographic region 101 that depicts all M=72 measurement locations and all K=49 partitions (after task 302 is performed).

In accordance with the illustrative embodiment, the location of all K partitions is stored in location engine 151 and is depicted in FIG. 5. A sample of the 49 values are listed in Table 3, and it will be clear to those skilled in the art how to determine the remaining values by inspecting FIG. 5.

TABLE 3

List of Partition Locations

| k | Partition Location PL(k) |
|---|---|
| 1 | (92.5, 67.5, 1.5) |
| 2 | (95.0, 67.5, 1.5) |
| . | . |
| . | . |
| . | . |
| 7 | (107.5, 67.5, 1.5) |
| 8 | (92.5, 65.0, 1.5) |
| . | . |
| . | . |
| . | . |
| 41 | (107.5, 55.0, 1.5) |
| 42 | (92.5, 52.5, 1.5) |
| . | . |
| . | . |
| . | . |
| 48 | (105.0, 52.5, 1.5) |
| 49 | (107.5, 52.5, 1.5) |

In accordance with the illustrative embodiment, each of the K partitions:

(i) is an identical box with the dimensions of 2.5 meters ($\Delta x$) by 2.5 meters ($\Delta y$) by 3 meters ($\Delta z$), and (ii) has the same volume of 18.75 m$^3$, and (iii) has a rectangular footprint projected onto the plane of geographic region 101 of 2.5 meters ($\Delta x$) by 2.5 meters ($\Delta y$).

The computational complexity of task 602 is reduced when each partition is an identical convex polyhedron that can be tessellated (e.g., a cube, a box, a triangular prism, etc.). It will be clear to those skilled in the art, after reading this disclosure, how to make and use alternative embodiments of the present invention in which:

(i) some or all of the partitions have a different shape, or (ii) some or all of the partitions have a different volume, or (iii) both i and ii.

In accordance with the illustrative embodiment, location engine 151 comprises neither a record of any radio-frequency (RF) obstacles in geographic region 101 nor a record of any areas that are devoid of any RF obstacles. In contrast, when the location engine does comprise a record of an RF obstacles or an area that is devoid of RF obstacles, it is usually advantageous to correlate the boundaries of some of the partitions with the boundaries of those obstacles and/or areas. This will complicate the complexity of task 602, but it is likely to improve the various estimates that are generated in task 604.

In general, the size, shape, and location of each partition should be chosen so that it is crossed by the straight-line path between each candidate location and at least one measurement location. When a partition is not crossed by the straight-line path between each candidate location and at least one measurement location, and that candidate location is estimated to be the location of reference radio 120-3, the value of the candidate excess path loss $e(n_1,n_2,k)$ for that partition will be meaningless.

Furthermore, the size, shape, and location of each partition should be chosen so that it is crossed by the straight-line path between each candidate location and at least several measurement locations. In general, this tends to increase the accuracy of the estimate of the candidate excess path loss $e(n_1,n_2,k)$ for that partition.

At task 303, location engine 151 generates:

(i) an estimate of the location of reference radio 120-3, and (ii) an estimate of the location of reference radio 120-4, and (iii) an estimate of the transmission power of the 2.4 GHz downlink control channel radio signal transmitted by reference radio 120-3, and (iv) an estimate of the transmission power of the 2.4 GHz downlink control channel radio signal transmitted by reference radio 120-4, and (v) an estimate of the excess path loss for each of the K partitions, and (vi) an estimate of the existence of the building, and (vii) an estimate of the location of the footprint of building, if the building is estimated to exist, and (viii) an estimate of the excess path loss for one or more portions of building, if the building is estimated to exist, and (ix) an estimate of the nature and location of the architectural features of building, if the building is estimated to exist.

based on which pairwise combination of candidate locations for reference radio 120-3 and reference radio 120-4 is most consistent with the measurement values and the candidate predictions of total path loss. Task 303 is described in detail below and in the accompanying figures.

Figure 6:
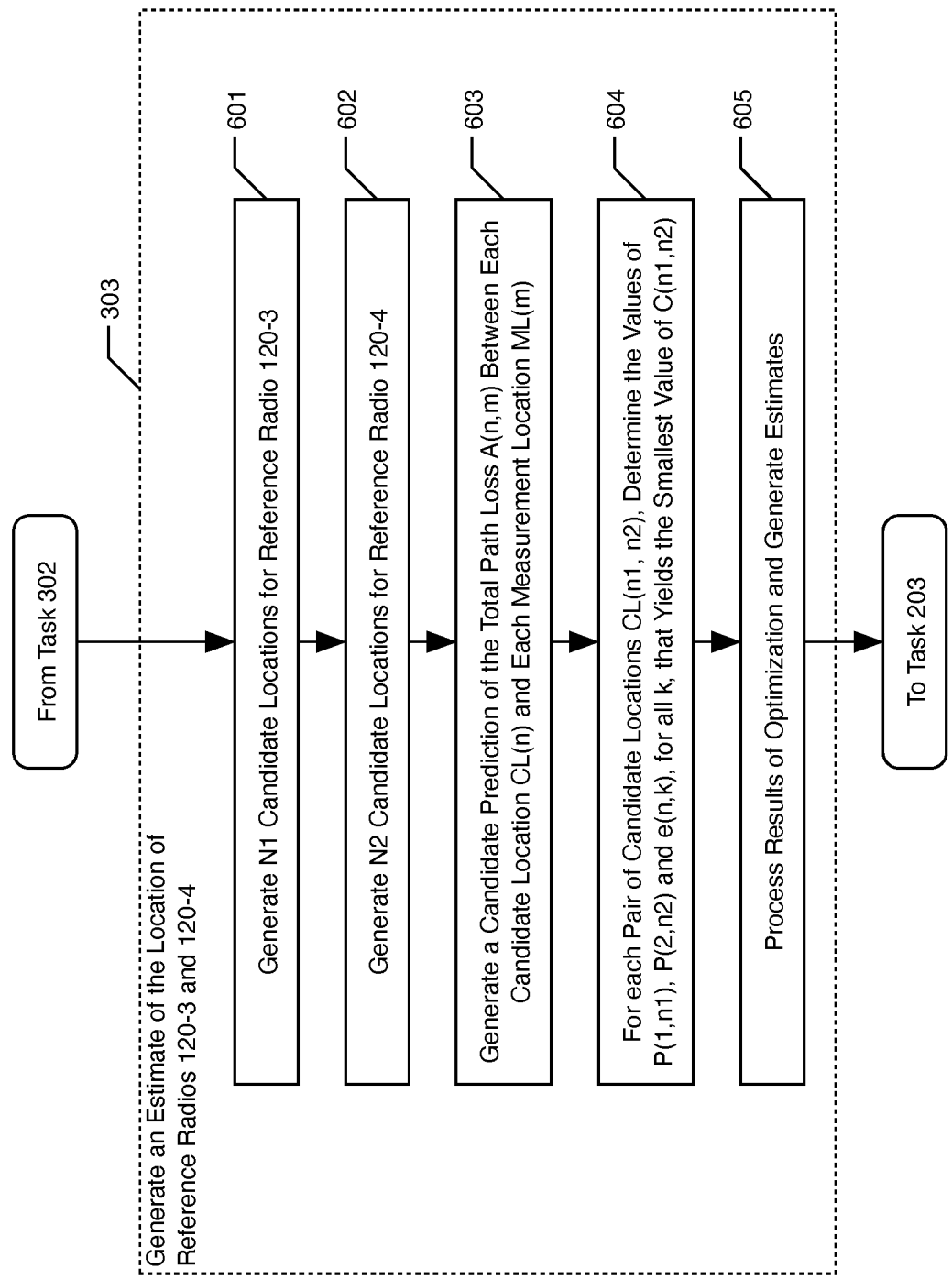
FIG. 6 depicts a flowchart of the subtasks associated with performing task 303 in accordance with the illustrative embodiment of the present invention.

FIG. 6 depicts a flowchart of the subtasks associated with performing task 303 in accordance with the illustrative embodiment of the present invention.

At task 601, location engine 151 generates $N_1$ candidate locations for the location of reference radio 120-3. The $N_1$ candidate locations are designated 1, 2, 3, . . . , $n_1$, . . . , $N_1$, where $N_1$ and $n_1$ are positive integers and $n_1$ is selected from the set {1, 2, 3, . . . , $N_1$}.

The $n_1$th candidate location is at candidate location $CL(n_1)$, which equals the (x,y,z) coordinate of a location in geographic region 101.

In accordance with the illustrative embodiment, all of the candidate locations are in the plane of geographic region 101, which is 1.5 meters above ground level, but it will be clear to those skilled in the art, after reading this disclosure, how to make and use alternative embodiments of the present invention in which some or all of the candidate locations are at any altitude.

In general, better estimates of the location of reference radio 120-3 are generated:

(i) for larger values of $N_1$ (so as to increase the likelihood that a candidate location is near the location suggested by the empirical data), and
  (ii) when the $N_1$ candidate locations are spatially diverse (so as to increase the likelihood that a candidate location is near the location suggested by the empirical data), and
  (iii) for larger values of M (so as to provide more empirical data on which to base the estimates), and
  (iv) when the M measurement locations are spatially diverse (so as to provide higher quality empirical data), and
  (v) when the M measurement locations are balanced and radially and azimuthally diverse around each candidate location (so as to provide higher quality empirical data).

For example, candidate locations on a 2.5 meter ($\Delta x$) by 2.5 meter ($\Delta y$) by 2.5 meter ($\Delta z$) orthogonal lattice are, in general, better than randomly-located candidate locations. Candidate locations on a 1 meter ($\Delta x$) by 1 meter ($\Delta y$) by 1 meter ($\Delta z$) orthogonal lattice are also likely to yield good estimates but require more work and can provide a unwarranted sense of precision.

To facilitate the reader's comprehension, the illustrative embodiment is presented with $N_1$=49 candidate locations. It will be clear to those skilled in the art, after reading this disclosure, how to make and use alternative embodiments of the present invention in which $N_1$ has any value (e.g., hundreds, thousands, millions, etc.).

Figure 7:
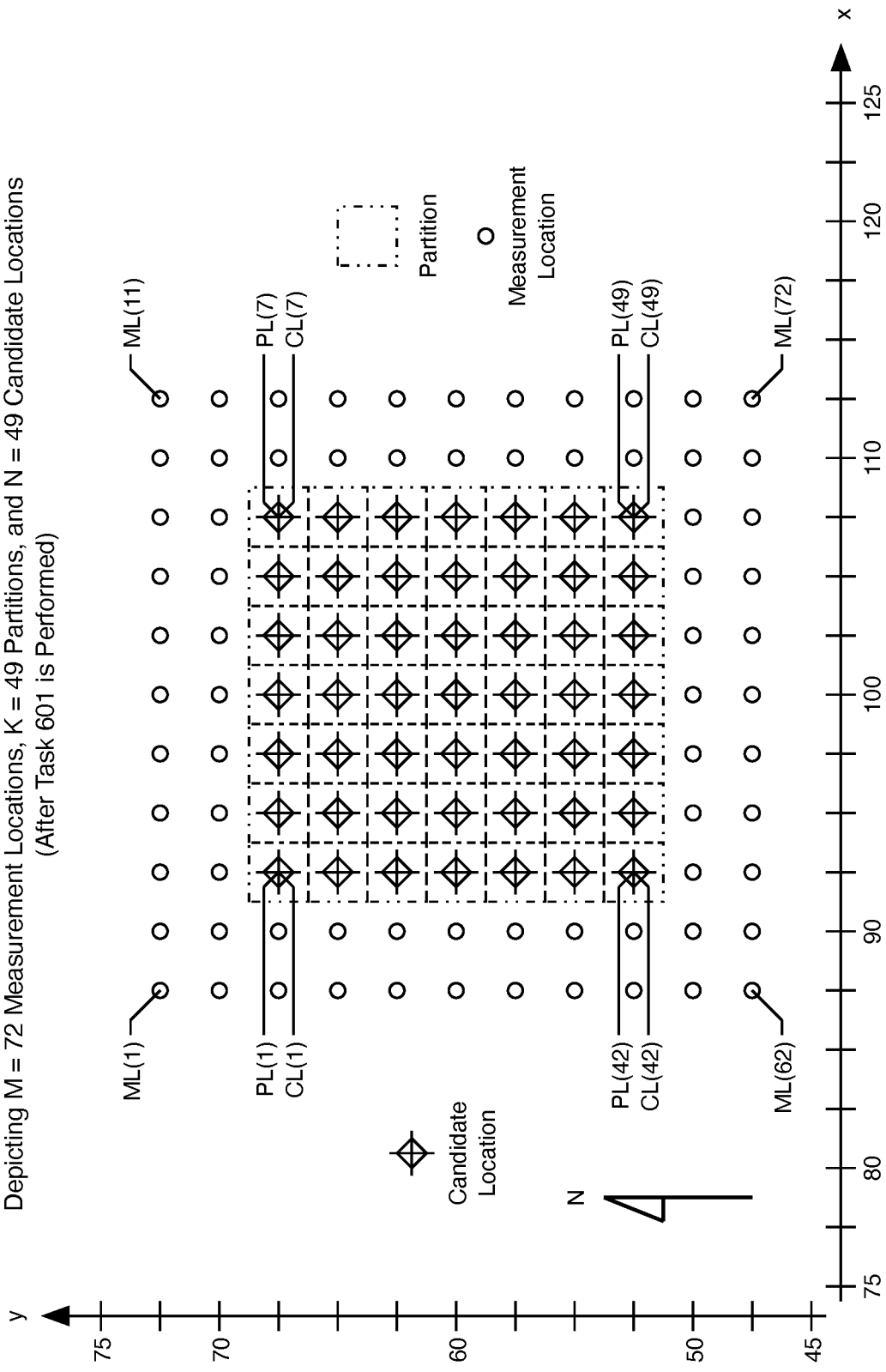
FIG. 7 depicts a map of a portion of geographic region 101 that depicts all M=72 measurement locations, all K=49 partitions, and all N=49 candidate locations (after task 601 is performed).

In accordance with the illustrative embodiment, candidate location $CL(n_1)=PL(n_1)$, for all $n_1$. The $N_1$ candidate locations $CL(1)$ through $CL(N_1)$ are stored in location engine 151 and depicted in FIG. 7. A sample of the 49 values are listed in Table 4, and it will be clear to those skilled in the art how to determine the remaining values by inspecting FIG. 7.

TABLE 4

List of Candidate Locations

| $n_1$ | Candidate Location $CL(n_1)$ |
|---|---|
| 1 | (92.5, 67.5, 1.5) |
| 2 | (95.0, 67.5, 1.5) |
| . | . |
| . | . |
| . | . |
| 7 | (107.5, 67.5, 1.5) |
| 8 | (92.5, 65.0, 1.5) |
| . | . |
| . | . |
| . | . |

TABLE 4-continued

List of Candidate Locations

| $n_1$ | Candidate Location $CL(n_1)$ |
|---|---|
| 41 | (107.5, 55.0, 1.5) |
| 42 | (92.5, 52.5, 1.5) |
| . | . |
| . | . |
| . | . |
| 48 | (105.0, 52.5, 1.5) |
| 49 | (107.5, 52.5, 1.5) |

It will be clear to those skilled in the art, after reading this disclosure, how to make and use alternative embodiments of the present invention in which:

(i) the number of candidate locations $N_1$ does not equal, and is unrelated to, the number of partitions K (i.e., $N_1 \neq K$), or
  (ii) the location of the $N_1$ candidate locations is unrelated to the shape, size, or location of the K partitions, or
  (iii) the location of the $N_1$ candidate locations is both inside and outside of buildings and other man-made structures, or
  (iv) any combination of i, ii, and iii.

Figure 8:
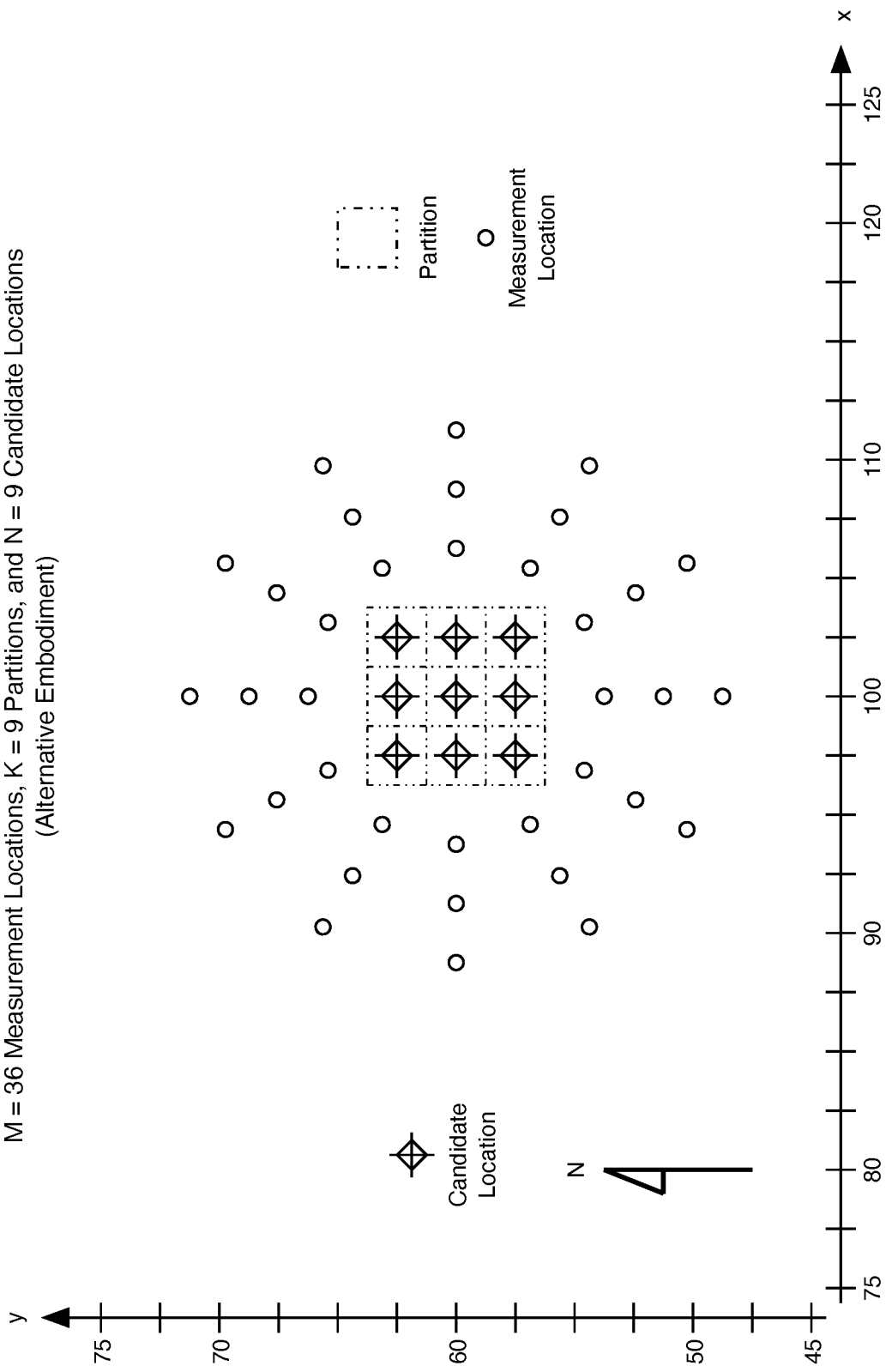
FIG. 8 depicts a map of an alternative embodiment of the present invention for M=36 measurement locations, K=9 partitions, and N=9 candidate locations.

For example, FIG. 8 depicts a map of an alternative embodiment of the present invention for M=36 measurement locations, K=9 partitions, and N=9 candidate locations.

At task 602, location engine 151 generates $N_2$ candidate locations for the location of reference radio 120-4. The $N_2$ candidate locations are designated 1, 2, 3, . . . , $n_2$, . . . , $N_2$, where $N_2$ and $n_2$ are positive integers and $n_2$ is selected from the set $\{1, 2, 3, \ldots, N_2\}$.

The $n_2$th candidate location is at candidate location $CL(n_2)$, which equals the (x,y,z) coordinate of a location in geographic region 101.

In accordance with the illustrative embodiment, all of the candidate locations are in the plane of geographic region 101, which is 1.5 meters above ground level, but it will be clear to those skilled in the art, after reading this disclosure, how to make and use alternative embodiments of the present invention in which some or all of the candidate locations are at any altitude.

In general, better estimates of the location of reference radio 120-4 are generated:

(i) for larger values of $N_2$ (so as to increase the likelihood that a candidate location is near the location suggested by the empirical data), and
  (ii) when the $N_2$ candidate locations are spatially diverse (so as to increase the likelihood that a candidate location is near the location suggested by the empirical data), and
  (iii) for larger values of M (so as to provide more empirical data on which to base the estimates), and
  (iv) when the M measurement locations are spatially diverse (so as to provide higher quality empirical data), and
  (v) when the M measurement locations are balanced and radially and azimuthally diverse around each candidate location (so as to provide higher quality empirical data).

For example, candidate locations on a 2.5 meter ($\Delta x$) by 2.5 meter ($\Delta y$) by 2.5 meter ($\Delta z$) orthogonal lattice are, in general, better than randomly-located candidate locations. Candidate locations on a 1 meter ($\Delta x$) by 1 meter ($\Delta y$) by 1 meter ($\Delta z$) orthogonal lattice are also likely to yield good estimates but require more work and can provide a unwarranted sense of precision.

To facilitate the reader's comprehension, the illustrative embodiment is presented with $N_1=49$ candidate locations. In other words, in accordance with the illustrative embodiment, $N_2=N_1=49$, but it will be clear to those skilled in the art, after reading this disclosure, how to make and use alternative embodiments of the present invention in which $N_2 \neq N_1$. It will be clear to those skilled in the art, after reading this disclosure, how to make and use alternative embodiments of the present invention in which $N_2$ has any value (e.g., hundreds, thousands, millions, etc.).

In accordance with the illustrative embodiment, candidate location $CL(n_2)=PL(n_2)$, for all $n_2$. The $N_2$ candidate locations $CL(1)$ through $CL(N_2)$ are stored in location engine 151 and depicted in FIG. 7. A sample of the 49 values are listed in Table 4, and it will be clear to those skilled in the art how to determine the remaining values by inspecting FIG. 7.

It will be clear to those skilled in the art, after reading this disclosure, how to make and use alternative embodiments of the present invention in which:

(i) the number of candidate locations $N_2$ does not equal, and is unrelated to, the number of partitions (i.e., $N_2 \neq K$), or (ii) the location of the $N_2$ candidate locations is unrelated to the shape, size, or location of the $K$ partitions, or (iii) the location of the $N_2$ candidate locations is both inside and outside of buildings and other man-made structures, or (iv) any combination of i, ii, and iii.

In accordance with the illustrative embodiment, $N_2=N_1$, and, therefore, the variable N is introduced to represent, where it facilitates the reader's comprehension and is mathematically appropriate, either or both of $N_1$ and $N_2$ (i.e., $N=N_1=N_2$). Furthermore, the variable n is introduced to represent, where it facilitates the reader's comprehension and is mathematically appropriate, either or both of $n_1$ and $n_2$ (i.e., n is a positive integer selected from the set $\{1, 2, 3, \ldots, N\}$.

At task 603, location engine 151 generates a candidate prediction of the total path loss $A(n,m)$ in dB for a hypothetical 2.4 GHz signal that propagates in a straight line from candidate location $CL(n)$ to measurement location $ML(m)$, for all n and m. In total, task 603 generates $N \cdot M=3{,}528$ candidate predictions of total path loss $A(n,m)$.

In accordance with the illustrative embodiment, location engine 151 does not comprise a record of any radio-frequency obstacles in the vicinity of the N candidate locations, the M measurement locations, or the vicinity of the straight-line signal paths between the N candidate locations and the M measurement locations. Therefore, the candidate prediction of the total path loss $A(n,m)$ comprises two components:

(i) the free-space path loss, which predicts the attenuation due to free-space path loss experienced by the hypothetical 2.4 GHz radio signal as it propagates in a vacuum in a straight line from candidate location $CL(n)$ to measurement location $ML(m)$, and (ii) the excess path loss, which predicts the attenuation in excess of the free-space path loss experienced by the hypothetical 2.4 GHz radio signal as it propagates though a non-vacuum medium in a straight line from candidate location $CL(n)$ to measurement location $ML(m)$.

It will be clear to those skilled in the art, after reading this disclosure, how to make and use alternative embodiments of the present invention in which the model on which the candidate predictions of total path loss $A(n,m)$ comprises fewer components, more components, or different components. Furthermore, it will be clear to those skilled in the art, after reading this disclosure, how to make and use alternative embodiments of the present invention in which the model on which the candidate predictions of total path loss $A(n,m)$ comprise components that predict non-straight-line effects of the radio-frequency (RF) environment (e.g., the effects of reflection, refraction, multipath, etc.).

In accordance with the illustrative embodiment, the candidate prediction of total path loss $A(n,m)$ equals:

$$A(n,m) = \text{FSPL}(n,m) + X(n,m) \quad \text{(Eq. 1)}$$

wherein:

FSPL$(n,m)$ is denominated in dB and is the attenuation due to free-space path loss experienced by the hypothetical 2.4 GHz radio signal as it propagates in a vacuum in a straight line from candidate location $CL(n)$ to measurement location $ML(m)$, and $X(n,m)$ is denominated in dB and is the attenuation in excess of the free-space path loss experienced by the hypothetical 2.4 GHz radio signal as it propagates though a non-vacuum medium in a straight line from candidate location $CL(n)$ to measurement location $ML(m)$.

Determining FSPL$(n,m)$—In accordance with the illustrative embodiment, the free-space path loss in dB for the hypothetical 2.4 GHz radio signal as it propagates in a straight line from candidate location $CL(n)$ to measurement location $ML(m)$ equals:

$$\text{FSPL}(n,m) = 20 \log_{10}(d(n,m)) + 20 \log_{10}(f) + 32.45 \quad \text{(Eq. 2)}$$

wherein:

f is denominated in GHz and is the frequency of the signal, and $d(n,m)$ is denominated in meters and is the straight-line distance from candidate location $CL(n)$ to measurement location $ML(m)$.

The straight-line distance $d(n,m)$ from candidate location $CL(n)$ to measurement location $ML(m)$ is computed using the Pythagorean Theorem in well-known fashion.

The $N \cdot M=49 \cdot 72=3{,}528$ values of $d(n,m)$ are stored in location engine 151. A sample of the 3,528 values are listed in Table 5, and it will be clear to those skilled in the art how to use the Pythagorean Theorem to calculate the remaining values.

TABLE 5

Straight-Line Distance $d(n, m)$ Between Candidate Location $CL(n)$ and Measurement Location $ML(m)$

| $d(n, m)$ | m = 1 | m = 2 | ... | m = 72 |
|---|---|---|---|---|
| n = 1 | 7.1 m | 5.6 m | ... | 28.3 m |
| n = 2 | 9.0 m | 7.1 m | ... | 26.6 m |
| . | . | . | . | . |
| . | . | . | . | . |
| . | . | . | . | . |
| n = 49 | 28.3 m | 26.6 m | ... | 7.1 m |

The 3,528 values of FSPL$(n,m)$ are calculated using Equation 2 in well-known fashion and are stored in location engine 151. A sample of the 3,528 values are listed in Table 6, and it will be clear to those skilled in the art how to calculate the remaining values.

TABLE 6

Free-Space Path Loss FSPL(n, m) Between
Candidate Location CL(n) and Measurement
Location ML(m) for 2.4 GHz Signal

| FSPL(n, m) | m = 1 | m = 2 | ... | m = 72 |
|---|---|---|---|---|
| n = 1 | 57.0 dB | 55.0 dB | ... | 69.1 dB |
| n = 2 | 59.2 dB | 57.0 dB | ... | 68.5 dB |
| . | . | . | . | . |
| . | . | . | . | . |
| . | . | . | . | . |
| n = 49 | 69.1 dB | 68.5 dB | ... | 57.0 dB |

Determining X(n,m)—In accordance with the illustrative embodiment, the excess path loss in dB that the hypothetical signal experiences as it propagates on the straight-line path from candidate location CL(n) to measurement location ML(m) equals:

$$X(n,m) = \Sum_{\forall k} e(n_1, n_2, k) \ast d(n, m, k) \quad \text{(Eq. 3)}$$

wherein:
$e(n_1, n_2, k)$ is denominated in dB per meter and is the candidate excess path loss per meter for partition k with respect to the pairwise combination of candidate location $CL(n_1)$ and candidate location $CL(n_2)$, and
$d(n, m, k)$ is denominated in meters and is the distance in meters that the hypothetical signal is in partition k as it travels in a straight line from candidate location CL(n) to measurement location ML(m).

The values of $e(n_1, n_2, k)$, for all $n_1$, $n_2$, k, are determined during optimization in task 604.

The N·M·K=172,872 values of d(n,m,k) are calculated in well-known fashion using the values in Tables 2, 3, and 4, the boundaries of the K partitions, and trigonometry. The 172,872 values of d(n,m,k) are stored in location engine 151, and a representative sample of them are listed in Table 7.

TABLE 7

Straight-Line Distance Between Candidate
Location CL(n) and Measurement Location
ML(m) in Partition k

| n, m | d(n, m, 1) | d(n, m, 2) | ... | d(n, m, 49) |
|---|---|---|---|---|
| 1, 1 | ≈1.77 m | 0.00 m | ... | 0.00 m |
| 1, 2 | ≈1.39 m | 0.00 m | ... | 0.00 m |
| . | . | . | . | . |
| . | . | . | . | . |
| . | . | . | . | . |
| 49, 72 | 0.00 m | 0.00 m | ... | ≈1.77 m |

It will be clear to those skilled in the art, after reading this disclosure, how to make and use alternative embodiments of the present invention that use a different method for predicting the total path loss A(n,m). For example, the following references describe and disclose the art and science of RF path-loss models:
(i) H. N. Bertoni, *Radio Propagation for Modern Wireless Systems*, Prentice Hall PTR, 2000; and
(ii) 3GPP, *3rd Generation Partnership Project; Technical Specification Group Radio Access Network; Study on channel model for frequencies from 0.5 to 100 GHz (Release 15)*, Valbonne, France, http://www.3gpp.org, 2018; and
(iii) I. Rodriguez et al., *An Empirical Outdoor-to-Indoor Path Loss Model from below 6 GHz to cm-Wave Frequency Bands*, IEEE Antennas and Wireless Propagation Letters, 2017,
and are incorporated by reference.

At task 604, location engine 151 determines which pair of candidate locations for reference radio 120-3 and reference radio 120-4 are most consistent with:
(i) the 3,528 candidate predictions of total path loss A(n,m), and
(ii) the 72 measurement values MV(1,m), and
(iii) the 72 measurement values MV(2,m),
for all n and m.

It will be clear to those skilled in the art, after reading this disclosure, that the process for estimating of the location of reference radio 120-3 could be performed completely independently of the process for estimating the location of reference radio 120-4. In other words, the 72 measurement values of MV(1,m) could be used to generate the estimate of:
the location of reference radio 120-3, and
the transmission power of the 2.4 GHz downlink control channel radio signal transmitted by reference radio 120-3.

Similarly, the 72 measurement values of MV(2,m) could be used to generate the estimate of:
the location of reference radio 120-4, and
the transmission power of the 2.4 GHz downlink control channel radio signal transmitted by reference radio 120-4.

And finally, either: the 72 measurement values of MV(1,m), or the 72 measurement values of MV(2,m) could be used to generate the estimates of:
the estimate of the excess path loss for one or more of the K partitions
the estimate of the existence of building 141, and
the estimate of the location of the footprint of building 141, and
the estimate of the excess path loss for one or more portions of building 141, and
the estimate of the nature and location of the architectural features of building 141.

In contrast, the illustrative embodiment integrates the two in a manner that provides, in general, better estimates for all of these than could be, in general, obtained by either alone. In particular, the illustrative embodiment uses:
the 72 measurement values of MV(1,m), and
the 72 measurement values of MV(2,m)
together to generate the estimates of:
the location of reference radio 120-3, and
the location of reference radio 120-4, and
the transmission power of the 2.4 GHz downlink control channel radio signal transmitted by reference radio 120-3, and
the transmission power of the 2.4 GHz downlink control channel radio signal transmitted by reference radio 120-4, and
the estimate of the excess path loss for one or more of the K partitions
the estimate of the existence of building 141, and
the estimate of the location of the footprint of building 141, and
the estimate of the excess path loss for one or more portions of building 141, and
the estimate of the nature and location of the architectural features of building 141.

To accomplish this, a metric $C(n_1, n_2)$ is generated that quantitatively evaluates the goodness of fit of the pairwise combination of $n_1$ and $n_2$ to:
(i) the 3,528 candidate predictions of total path loss A(n,m), and (ii) the 72 measurement values MV(1,m), and (iii) the 72 measurement values MV(2,m), and (iv) a candidate value P(1, $n_1$, $n_2$) of the transmission power of reference radio 120-3 with respect to reference radio 120-3 being at candidate location CL($n_1$) and reference radio 120-4 being at candidate location CL($n_2$), and (v) a candidate value P(2, $n_1$, $n_2$) of the transmission power of reference radio 120-4 with respect to reference radio 120-3 being at candidate location CL($n_1$) and reference radio 120-4 being at candidate location CL($n_2$)

for all $n_1$, $n_2$, and m. In accordance with the illustrative embodiment, the goodness of fit for each pairwise combination of $n_1$ and $n_2$ is measured by determining which values of P(1, $n_1$, $n_2$), P(2, $n_1$, $n_2$), and e($n_1$, $n_2$, k), for all $n_1$, $n_2$, and k, minimize the value of C($n_1$,$n_2$), where C($n_1$, $n_2$) represents the goodness of fit for reference radio 120-3 being at candidate location CL($n_1$) and reference radio 120-4 being at candidate location CL($n_2$). This requires evaluating $N_1 \cdot N_2 = 2401$ pairwise combinations of the location of reference radio 120-3 and reference radio 120-4. In accordance with the illustrative embodiment, the value of C($n_1$,$n_2$), for an all $n_1$ and $n_2$, is defined by the objective function:

$$C(n_1, n_2) = \sum_{\forall m} \left\{ \begin{array}{l} (MV(1, m) - P(1, n_1, n_2) + A(n_1, m))^2 + \\ (MV(2, m) - P(2, n_1, n_2) + A(n_2, m))^2 \end{array} \right\} \quad \text{(Eq. 4)}$$

It will be clear to those skilled in the art how to determine the values of P(1,$n_1$,$n_2$), P(2,$n_1$,$n_2$), and e($n_1$,$n_2$,k), for all $n_1$, $n_2$, and k, that minimize the value of C($n_1$,$n_2$) using well-known computational optimization techniques (e.g., hill climbing with random restart, genetic algorithms, etc.).

In accordance with the illustrative embodiment, the minimum value of C($n_1$,$n_2$) and with the corresponding values of P(1,$n_1$,$n_2$), P(2,$n_1$,$n_2$), and e($n_1$,$n_2$,k), for an all $n_1$, $n_2$, and k are stored in location engine 151. Table 9 lists a sample of the (simulated) values of P(1,$n_1$,$n_2$) and P(2,$n_1$,$n_2$), including the values that correspond to the minimum value of C($n_1$,$n_2$) 479 for $n_1$=24 and $n_2$=27. Table 10 lists a sample of the (simulated) values for e($n_1$,$n_2$,k), including the values that correspond to the minimum value of C($n_1$,$n_2$) 479 for $n_1$=24 and $n_2$=27.

TABLE 9

Goodness of Fit Scores for P(1, $n_1$, $n_2$) and P(2, $n_1$, $n_2$)

| $n_1$ | $n_2$ | Minimum Value of C($n_1$, $n_2$) | Estimated Transmission Power P(1, $n_1$, $n_2$) | Estimated Transmission Power P(2, $n_1$, $n_2$) |
|---|---|---|---|---|
| 1 | 1 | ≈21,727 | ≈19 dBm | ≈20 dBm |
| 1 | 2 | ≈24,835 | ≈19 dBm | ≈20 dBm |
| . | . | . | . | . |
| . | . | . | . | . |
| 24 | 27 | ≈479 | ≈20 dBm | ≈20 dBm |
| . | . | . | . | . |
| . | . | . | . | . |
| 49 | 49 | ≈17,823 | ≈21 dBm | ≈26 dBm |

TABLE 10

Goodness of Fit of Scores for e($n_1$, $n_2$, k)

| $n_1$ | $n_2$ | Minimum Value of C($n_1$, $n_2$) | e($n_1$, $n_2$, 1) | ... | e($n_1$, $n_2$, 49) |
|---|---|---|---|---|---|
| 1 | 1 | ≈21,727 | ≈0.2 dB/m | ... | ≈0.0 dB/m |
| 1 | 2 | ≈24,835 | ≈0.2 dB/m | ... | ≈0.0 dB/m |
| . | . | . | . | . | . |
| 24 | 27 | ≈479 | ≈0.1 dB/m | ... | ≈0.0 dB/m |
| . | . | . | . | . | . |
| 49 | 49 | ≈17,823 | ≈0.0 dB/m | ... | ≈0.0 dB/m |

It will be clear to those skilled in the art, after reading this disclosure, how to make and use alternative embodiments of the present invention that use a different objective function than that in Equation 4.

At task 605, location engine 151 processes the results of task 604 and generates:

(i) an estimate of the location of reference radio 120-3, which might be inside or outside of a building, and (ii) an estimate of the location of reference radio 120-4, which might be inside or outside of a building, and (iii) an estimate of the transmission power of the 2.4 GHz downlink control channel radio signal transmitted by reference radio 120-3, and (iv) an estimate of the transmission power of the 2.4 GHz downlink control channel radio signal transmitted by reference radio 120-4, and (v) an estimate of the excess path loss for each of the K partitions, and (vi) an estimate of whether a building exists, (vii) an estimate of the location of the footprint of the building, if the building is estimated to exist, and (viii) an estimate of the excess path loss for at least a portion of the building, if the building is estimated to exist, and (ix) an estimate of the nature and location of one or more architectural features of the building, if the building is estimated to exist.

Task 605 is described in detail below and in the accompanying figures. After task 605 is complete, control returns to task 203.

Figure 9:
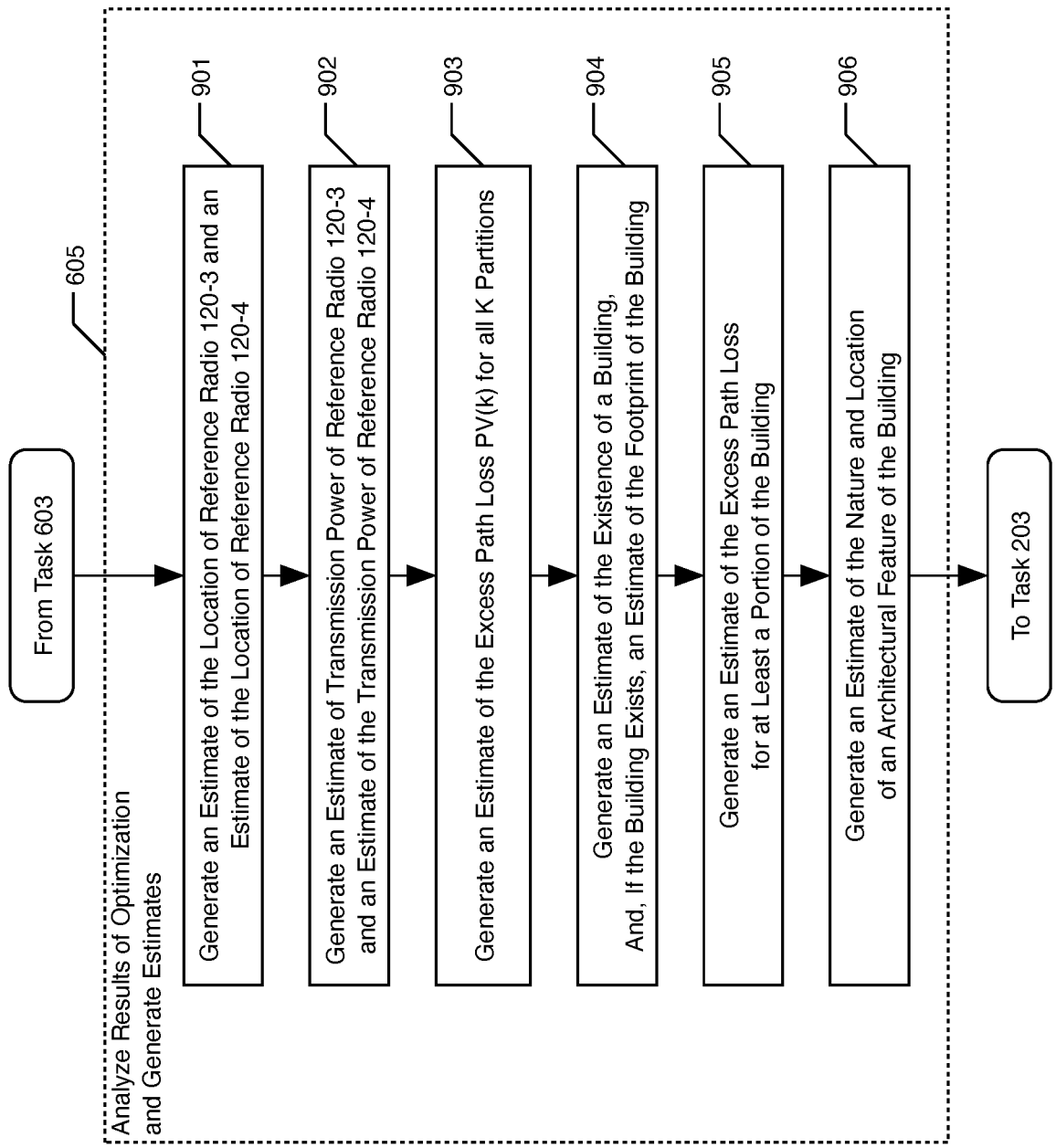
FIG. 9 depicts a flowchart of the subtasks associated with task 604—analyzing the results of task 603 and generating the various estimates.

FIG. 9 depicts a flowchart of the subtasks associated with task 605—analyzing the results of task 604 and generating the various estimates.

At task 901, location engine 151 generates the estimate of the location of reference radio 120-3 and the estimate of the location of reference radio 120-4. Because the minimum value of C($n_1$,$n_2$) is found at $n_1$=24 and $n_2$=27, location engine 151:

(i) estimates that reference radio 120-3 is at candidate location CL($n_1$=24), which is at coordinates (97.5, 60, 1.5), and (ii) estimates that reference radio 120-4 is at candidate location CL($n_2$=27), which is at coordinates (105, 60, 1.5).

At task 902, location engine 151 generates the estimate of the transmission power of the 2.4 GHz downlink control channel radio signal transmitted by reference radio 120-3 and the transmission power of the 2.4 GHz downlink control channel radio signal transmitted by reference radio 120-3.

Because the minimum value of $C(n_1,n_2)$ is found at $n_1=24$ and $n_2=27$, location engine 151:
  (i) estimates that the transmission power of the 2.4 GHz downlink control channel radio signal transmitted by reference radio 120-3 is the value of $P(1, n_1=24, n_2=27)$, which is 20 dBm, and
  (ii) estimates that the transmission power of the 2.4 GHz downlink control channel radio signal transmitted by reference radio 120-4 is the value of $P(2, n_1=24, n_2=27)$, which is 26 dBm.

At task 903, location engine 151 generates the estimates of the excess path loss per meter in each of the K partitions. Because the minimum value of $C(n_1,n_2)$ is found at $n_1=24$ and $n_2=27$, location engine 151 estimates the value of PV(k), for all k, to be $e(n_1=24, n_2=27, k)$, respectively (i.e., PV(k) =e(24, 27, k), for all k). Each of the corresponding 49 (simulated) values of PV(k) is depicted inside partition k in FIG. 10.

At task 904, location engine 151 generates an estimate B of whether a building exists within the area covered by the K partitions. In accordance with the illustrative embodiment, location engine 151 generates the estimate by analyzing the K values of PV(k) and their spatial relationship, which is depicted in FIG. 10.

In general, this problem is analogous to many vision-oriented artificial intelligence problems, such as optical character recognition and face recognition, and it will be clear to those skilled in the art, after reading this disclosure, how to make and use alternative embodiments of the present invention that use alternative techniques to generate the estimate of whether a building exists by examining the K values of PV(k) and their spatial relationship.

In accordance with the illustrative embodiment, location engine 151 generates an estimate of the existence of a building for each closed loop of partitions in which each partition exceeds a threshold equal to the mean partition value plus 0.5 standard deviations. Using the values in FIG. 10, the mean of the K=49 values of PV(k) is ≈2.59, the standard deviation is ≈3.38, and the mean plus 0.5 standard deviations equals ≈4.27.

Figure 10:
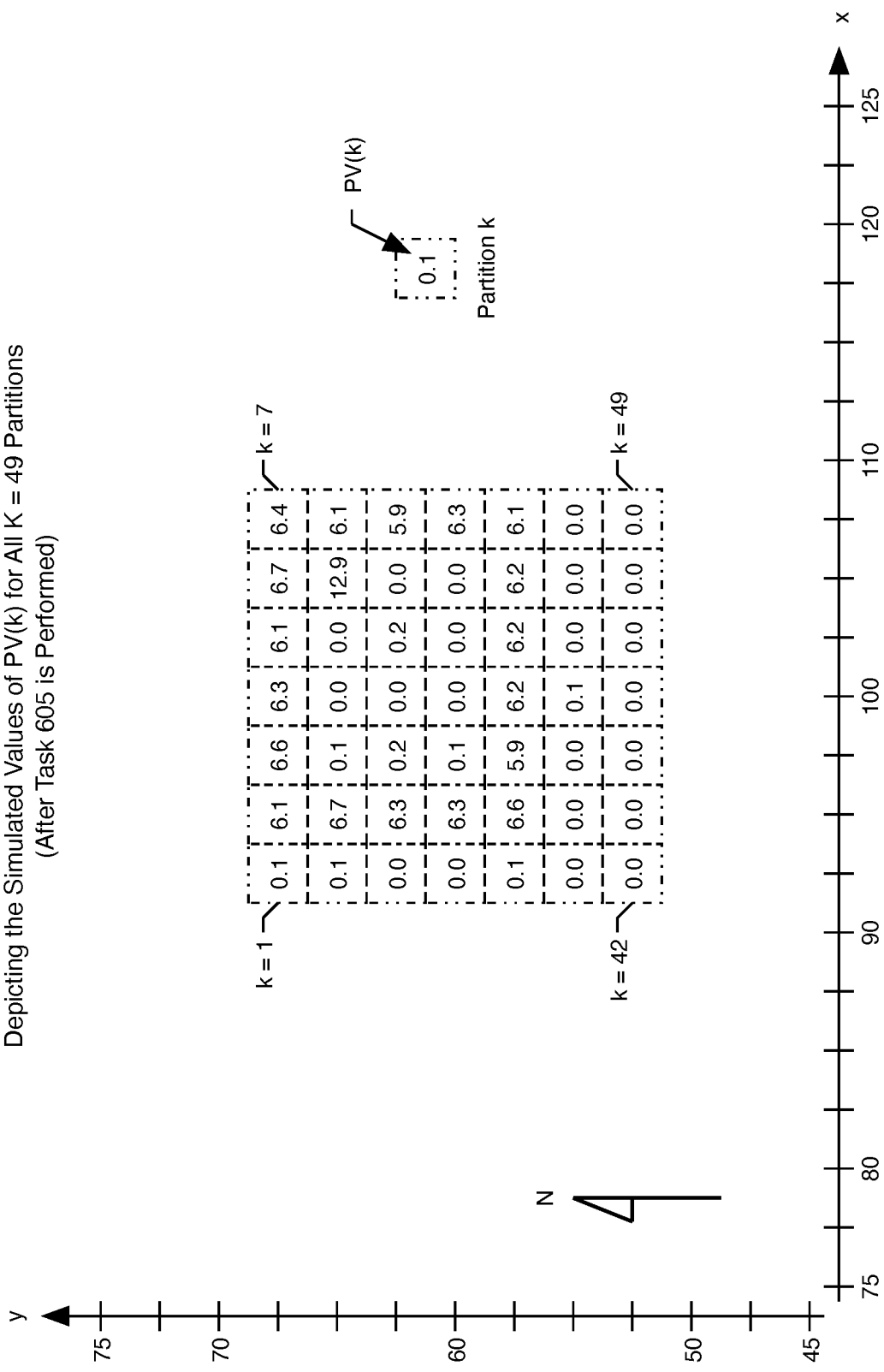
FIG. 10 depicts a portion of geographic region 101 that depicts the (simulated) values of excess path loss per meter PV(k) for all K=49 partitions (after task 605 is performed).

In examining the values in FIG. 10, there is one closed loop of partitions in which each partition exceeds the threshold of 4.27 dB/meter. The loop—also known as a candidate footprint of a building—comprises 18 partitions. They are partitions 2, 3, 4, 5, 6, 7, 9, 14, 16, 21, 23, 28, 30, 31, 32, 33, 34, and 35, as connected in FIG. 11.

In accordance with the illustrative embodiment, the estimate B of whether a building exists equals:

$$\frac{L}{T+L} \quad \text{(Eq. 5)}$$

where:
  T equals the mean of PV(k), for all k, ≈2.59, and
  L equals the mean of PV(k) for the 18 partitions that compose the candidate footprint of a building, which ≈6.27.

Therefore, the value of B equals ≈0.71 or ≈71%. Because the value of B exceeds 50%, location engine 151 decides that the building does, in fact, exist, and location engine 151 designates it as building 141.

Figure 11:
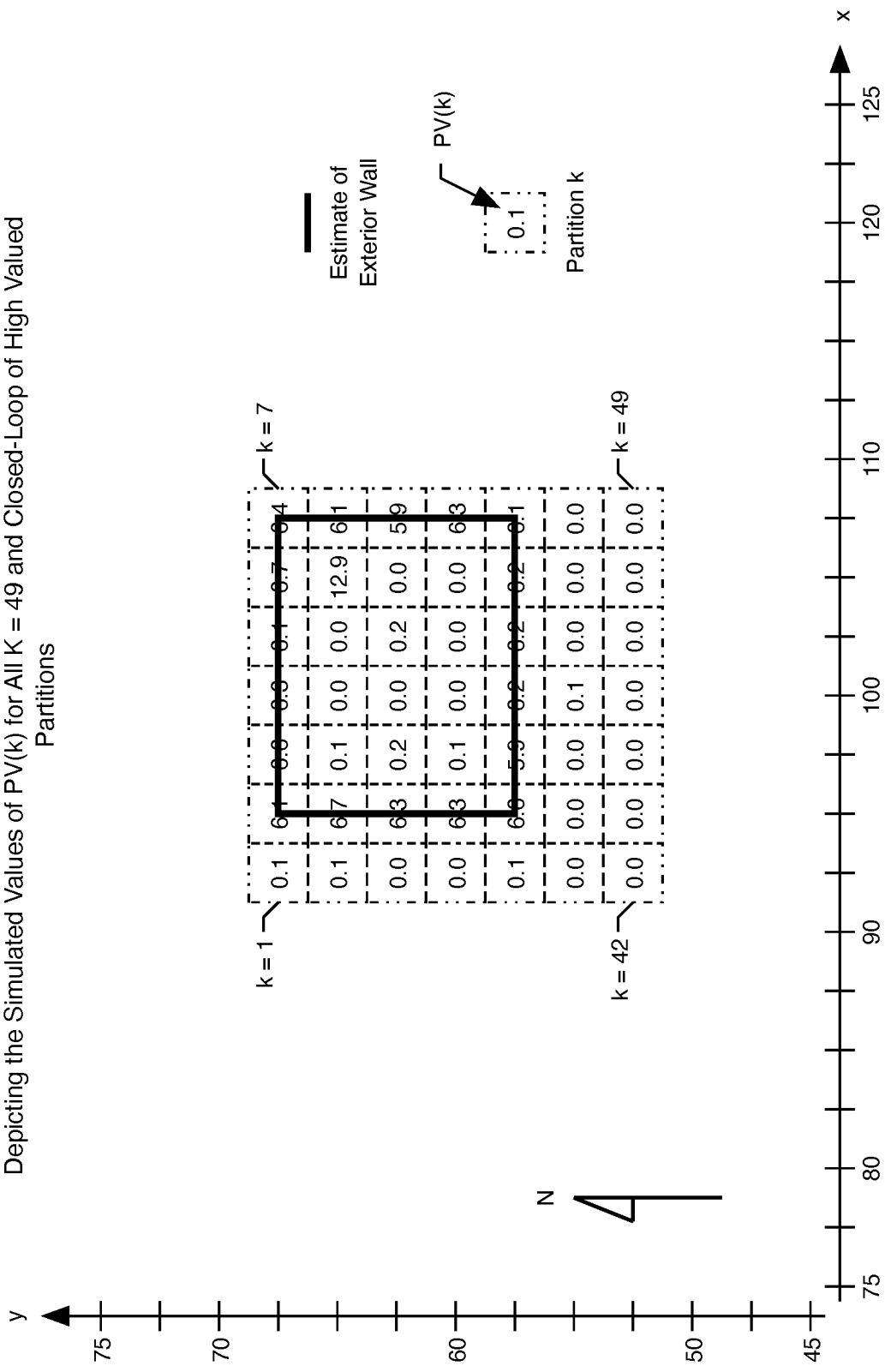
FIG. 11 depicts a portion of geographic region 101 that depicts the (simulated) values of excess path loss per meter PV(k) for all K=49 partitions and a candidate footprint of a building (during task 904).

As part of task 904, location engine 151 generates an estimate of the location of the footprint of building 141. Because the value of B exceeds 50%, the candidate footprint of a building, as shown by the heavy dark line in FIG. 11, is estimated to be the location of the footprint of building 141.

At task 905, location engine 151 generates an estimate of the excess path loss for at least a portion of building 141. In accordance with the illustrative embodiment, location engine 151 estimates that the excess path loss for 2.4 GHz signals for the exterior walls of building 141 corresponds to the 18 values of PV(k) that compose the perimeter of building 141.

Furthermore, location engine 151 estimates that the excess path loss for 2.4 GHz signals for the interior of building 141 corresponds to the value of PV(k) for the 12 partitions (i.e., partitions 10, 22, 12, 13, 17, 18, 19, 20, 23, 24, 25, and 26) within the perimeter of building 141.

At task 906, location engine 151 generates an estimate of the location of one or more architectural features of building 141. Like task 904, this problem is analogous to many vision-oriented artificial intelligence problems, and it will be clear to those skilled in the art, after reading this disclosure, how to make and use alternative embodiments of the present invention that use alternative techniques to identify architectural features. For example, it is well known to those skilled in the art that many architectural features exhibit both a typical range of spatial footprints and a typical range of values of excess path loss per meter.

By examining the values of PV(k) for the 12 partitions within the perimeter of building 141 (i.e., partitions 10, 11, 12, 13, 17, 18, 19, 20, 23, 24, 25, and 26) and their spatial relationship, location engine 151 observes that the interior of building 141 comprises a single partition—partition 13—with an excess path loss per meter for 2.4 GHz signals of between 4.7 and 6.0. Based on this, location engine 151 estimates that partition 13 comprises a steam boiler (i.e., there is a boiler at PL(13)). It will be clear to those skilled in the art, after reading this disclosure, how to make and use alternative embodiments of the present invention that are capable of estimating the location of one or more architectural features in a building from the values of excess path loss per meter and their spatial relationship.

Figure 12:
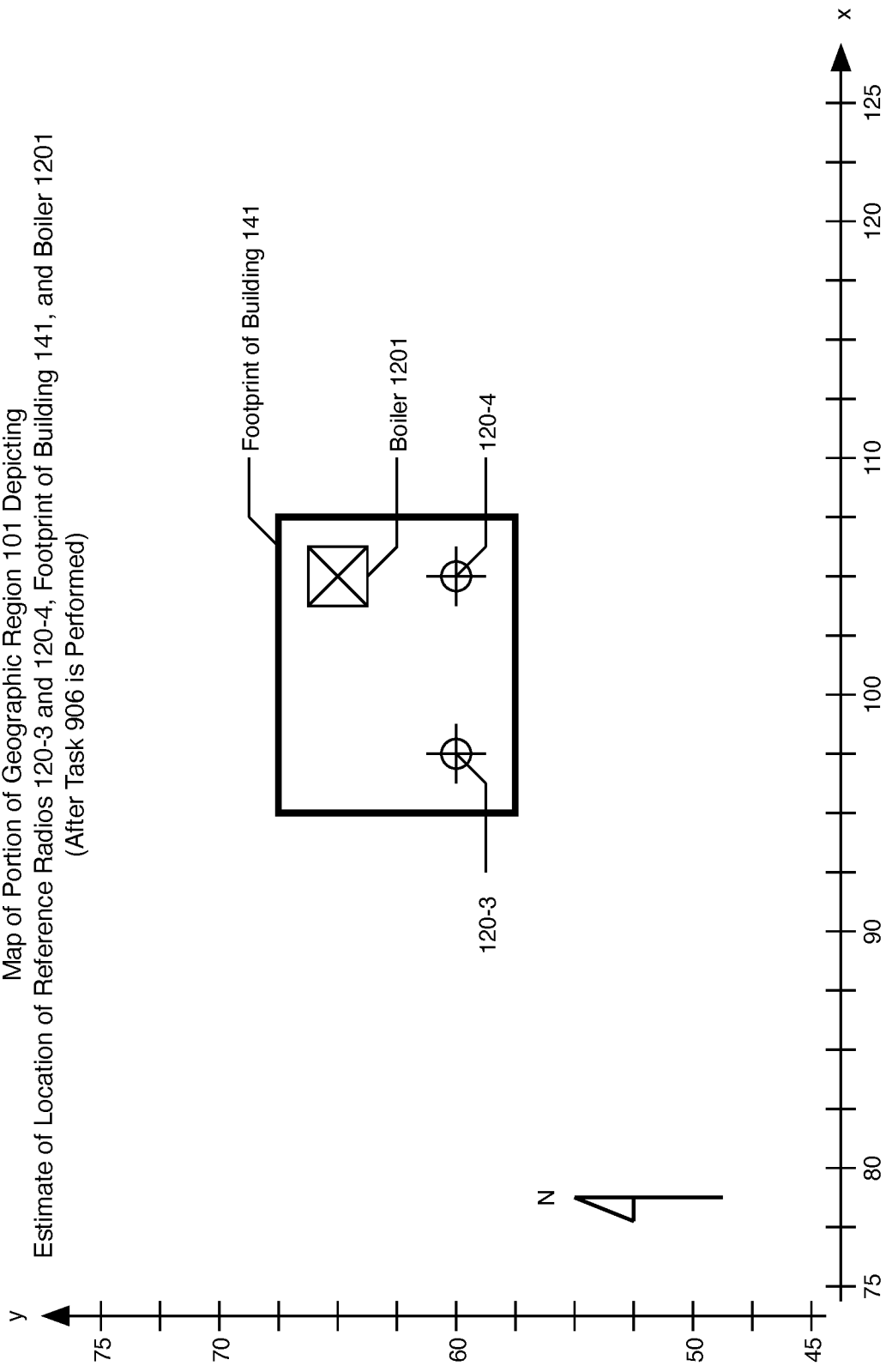
FIG. 12 depicts a map of a portion of geographic region 101, which depicts the estimated location of the footprint of building 141, the estimated location of reference radio 120-3, the estimated location of reference radio 120-4, and the estimated location of boiler 1201 within building 141.

FIG. 12 depicts a map of a portion of geographic region 101, which depicts the estimated location of the footprint of building 141, the estimated location of reference radio 120-3, the estimated location of reference radio 120-4, and the estimated location of boiler 1201 within building 141.

Figure 13:
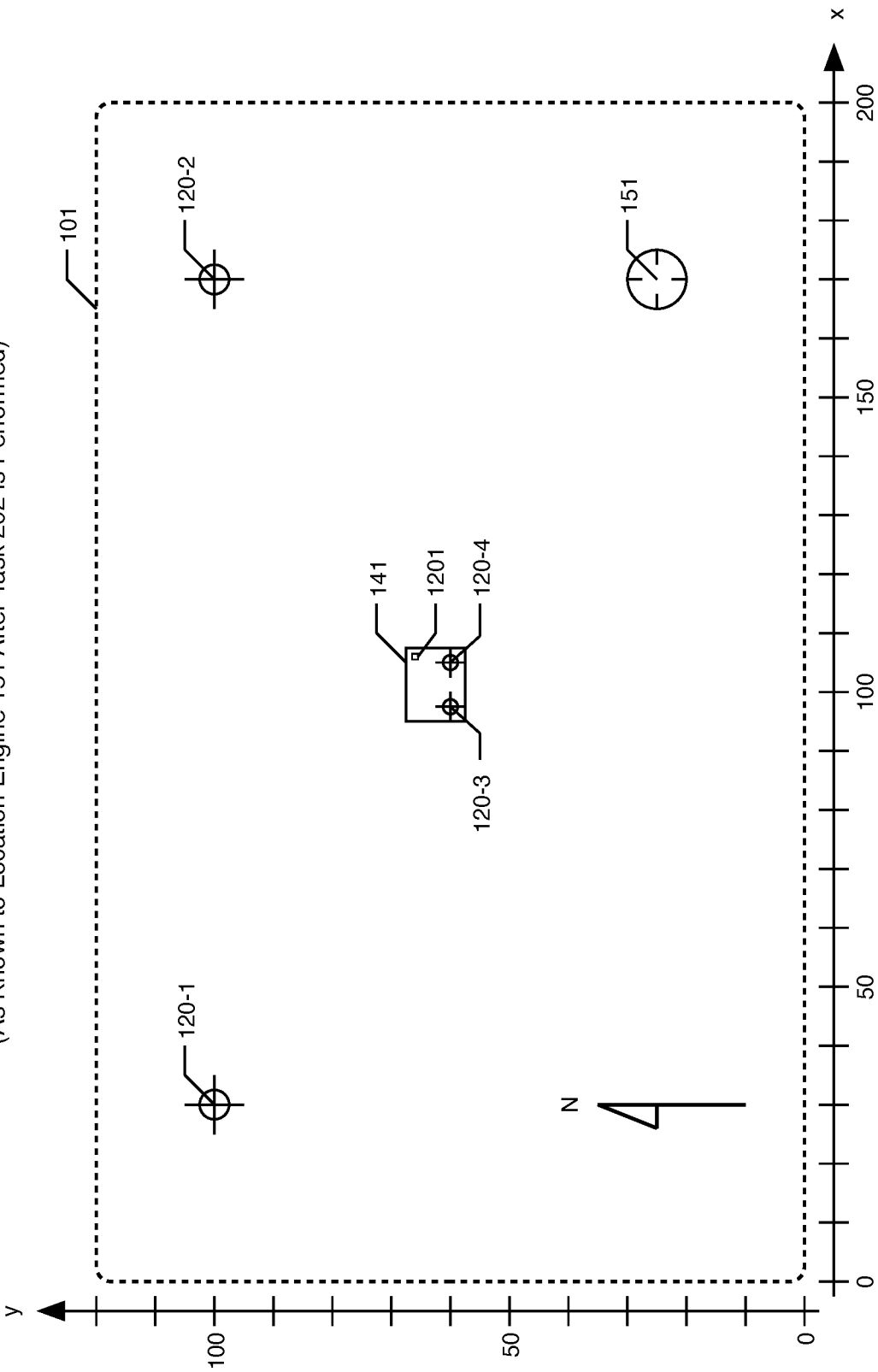
FIG. 13 depicts a map of geographic region 101 as known to location engine 151 after Task 202 is performed.

FIG. 13 depicts a map of geographic region 101 as known to location engine 151 after task 202 is performed. The map depicts the location reference radio 120-1, reference radio 120-2, the estimated location of reference radio 120-3, the estimated location of reference radio 120-4, the estimated footprint of building 141, the estimated location of boiler 1201, and location engine 151.

Figure 14:
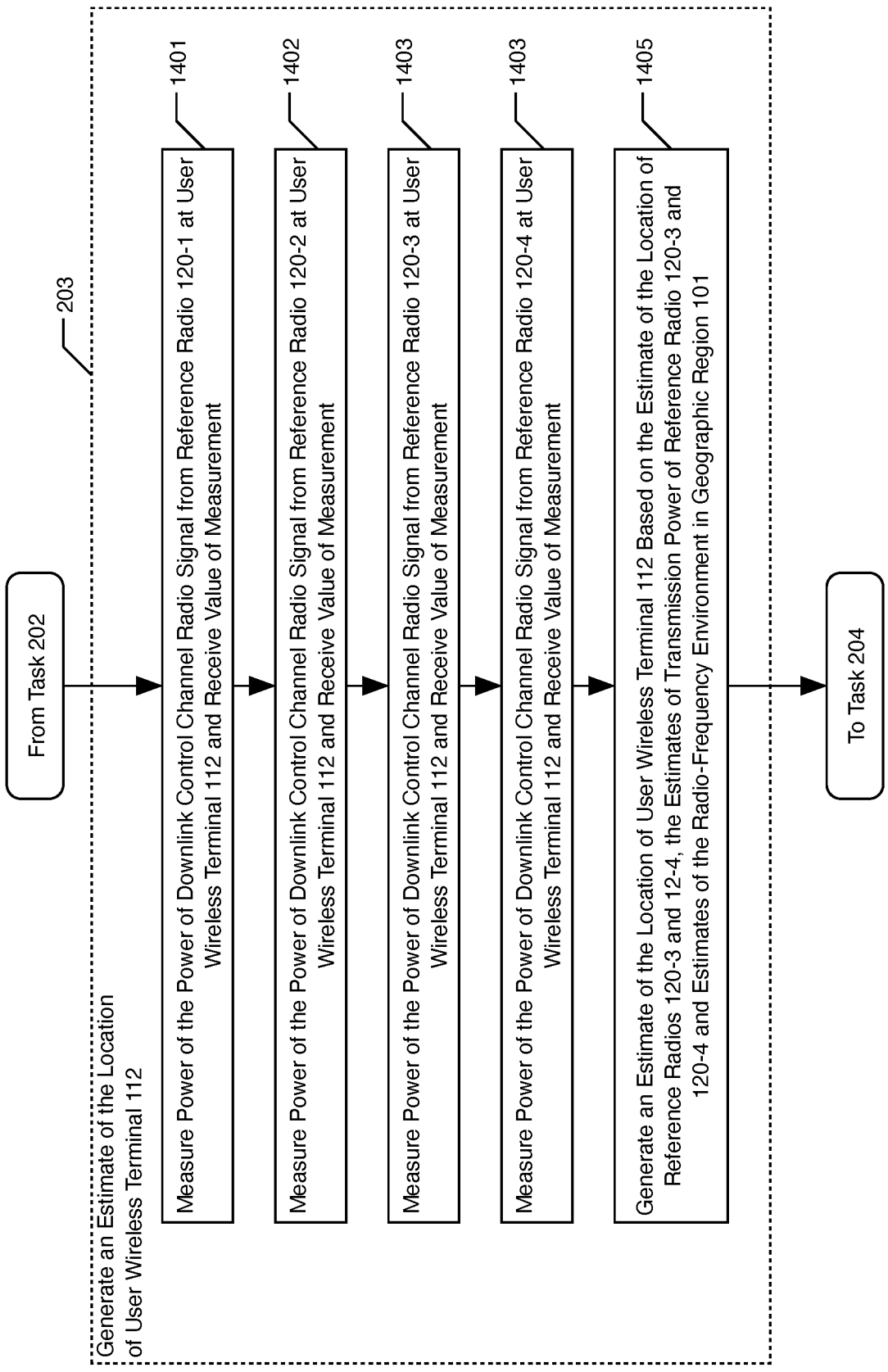
FIG. 14 depicts a flowchart of the subtasks performed in accordance with task 203—generating an estimate of the location of user wireless terminal 112.

FIG. 14 depicts a flowchart of the subtasks performed in accordance with task 203—generating an estimate of the location of user wireless terminal 112.

At task 1401, user wireless terminal 112:
  (i) measures the power of the 800 MHz downlink control channel radio signal that is transmitted by reference radio 120-1, and
  (ii) transmits the value of the measurement to location engine 151.

As part of task 1401, location engine 151 receives the measurement, which in accordance with the illustrative embodiment is −31 dBm.

At task 1402, user wireless terminal 112 measures:
  (i) measures the power of the 800 MHz downlink control channel radio signal that is transmitted by reference radio 120-2, and
  (ii) transmits the value of the measurement to location engine 151.
As part of task 1402, location engine 151 receives the measurement, which in accordance with the illustrative embodiment is −49 dBm.

At task 1403, user wireless terminal 112 measures:
  (i) measures the power of the 2.4 GHz downlink control channel radio signal that is transmitted by reference radio 120-3, and
  (ii) transmits the value of the measurement to location engine 151.
As part of task 1403, location engine 151 receives the power, which in accordance with the illustrative embodiment is −52 dBm.

At task 1404, user wireless terminal 112 measures:
  (i) measures the power of the 2.4 GHz downlink control channel radio signal that is transmitted by reference radio 120-4, and
  (ii) transmits the value of the measurement to location engine 151.
As part of task 1403, location engine 151 receives the power, which in accordance with the illustrative embodiment is −46 dBm.

At task 1405, location engine 151 generates an estimate of the location of user wireless terminal 112 based on:
  (i) the measurement by user wireless terminal 112 of the power of:
    (1) the 800 MHz downlink control channel radio signal that is transmitted by reference radio 120-1, and
    (2) the 800 MHz downlink control channel radio signal that is transmitted by reference radio 120-2, and
    (3) the 2.4 GHz WiFi downlink control channel radio signal that is transmitted by reference radio 120-3, and
    (4) the 2.4 GHz WiFi downlink control channel radio signal that is transmitted by reference radio 120-4, and
  (ii) the record of:
    (1) the location of reference radio 120-1, and
    (2) the location of reference radio 120-2, and
  (iii) the estimate of:
    (1) the location of reference radio 120-3, and
    (2) the location of reference radio 120-4, and
  (iv) the record of:
    (1) the 800 MHz downlink control channel radio signal that is transmitted by reference radio 120-1, and
    (2) the 800 MHz downlink control channel radio signal that is transmitted by reference radio 120-2, and
  (v) the estimate of:
    (1) the 2.4 GHz WiFi downlink control channel radio signal that is transmitted by reference radio 120-3, and
    (2) the 2.4 GHz WiFi downlink control channel radio signal that is transmitted by reference radio 120-4, and
  (vi) the estimate of the excess path loss for one or more of the partitions of geographic region 101, and
  (vii) the estimate of the existence of building 141, and
  (viii) the estimate of the location of the footprint of building 141, and
  (ix) the estimate of the excess path loss for one or more portions of building 141, and
  (x) the estimate of the nature and location of boiler 1201.

It will be clear to those skilled in the art how to make and use embodiments of the present invention that perform task 1405 using one or more techniques in the prior art (e.g., radio-signal pattern matching, radio-signal identification, etc.). For example, location engine 151 estimates the probability that user wireless terminal 112 is inside boiler 1201 to be approximately zero. In accordance with the illustrative embodiment, the location of user wireless terminal 112 is estimated to be at (130, 50, 1.5).

FIG. 15 depicts a map of geographic region 101 as known to location engine 151 after task 203 is performed. The map depicts the location reference radio 120-1, reference radio 120-2, the estimated location of reference radio 120-3, the estimated location of reference radio 120-4, the estimated footprint of building 141, the estimated location of boiler 1201, location engine 151, and user wireless terminal 112 (as estimated in task 203).

It will be clear to those skilled in the art, after reading this disclosure, how to make and use alternative embodiments of the present invention in which the number of candidate locations is treated as infinite. In such cases the index variable n is recast in terms of the co-ordinates (x,y,z), and task 603 is approached as an optimization problem over a continuous space using a standard (iterative or heuristic) computational optimization technique (e.g., hill climbing with random restart, genetic algorithms, etc.). In these cases, the goal would be to find the values of (x,y,z) and P(x,y,z) that yield the lowest value of C(x,y,z) (within some margin of error a) for all m measurement values MV(m) as, for example and without limitation, in:

$$C(x,y,z) = \Sigma_{\forall m}(MV(m) - P(x,y,z) + A(x,y,z,m))^2 \qquad \text{(Eq. 6)}$$

In this case, the values of (x,y,z) that yield the lowest value of C(x,y,z) would be the best estimate of the location of the reference radio, and the associated value of P(x,y,z) would be the best estimate of the transmission power of the downlink control channel radio signal by the reference radio.

Furthermore, it will be clear to those skilled in the art, after reading this disclosure, how to make and use alternative embodiments of the present invention in which reference radio 120-3 transmits a plurality of downlink control channel radio signals at different frequencies (e.g., 2.4 GHz and 5.0 GHz, etc.). In these cases, the measurement values are of both signals, and equation 4 is optimized based on the measurement values of both signals and the candidate predictions of total path loss for both signals.

And still furthermore, it will be clear to those skilled in the art, after reading this disclosure, how to make and use alternative embodiments of the present invention in which there are two or more newly-discovered reference radios at different locations. In these cases, the measurement values are of both signals, and equation 6 is optimized based on the measurement values of both signals and the candidate predictions of total path loss for both signals.

It is to be understood that the disclosure teaches just one example of the illustrative embodiment and that many variations of the invention can easily be devised by those skilled in the art after reading this disclosure and that the scope of the present invention is to be determined by the following claims.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
receiving:
(i) a first measurement value MV(1,1) of a first radio signal as received at a first measurement location ML(1), wherein the first radio signal is transmitted by a first radio transmitter and is characterized by a wavelength $\lambda$, and
(ii) a second measurement value MV(1,2) of the first radio signal as received at a second measurement location ML(2), wherein second measurement location is different than the first measurement location, and
(iii) a third measurement value MV(2,1) of a second radio signal as received at the first measurement location ML(1), wherein the second radio signal is transmitted by a second radio transmitter and is characterized by the wavelength $\lambda$, and
(iv) a fourth measurement value MV(2,2) of the second radio signal as received at the second measurement location ML(2); and
generating:
(i) a first candidate location CL(1) for the first radio transmitter and for the second radio transmitter, and
(ii) a second candidate location CL(2) for the first radio transmitter and for the second radio transmitter;
generating:
(i) a first candidate prediction of the total path loss A(1,1) for a hypothetical radio signal from the first candidate location CL(1) to the first measurement location ML(1), wherein the hypothetical radio signal is characterized by the wavelength $\lambda$, and
(ii) a second candidate prediction of the total path loss A(1,2) for the hypothetical radio signal from the first candidate location CL(1) to the second measurement location ML(2), and
(iii) a third candidate prediction of the total path loss A(2,1) for the hypothetical radio signal from the second candidate location CL(2) to the first measurement location ML(1), and
(iv) a fourth candidate prediction of the total path loss A(2,2) for the hypothetical radio signal from the second candidate location CL(2) to the second measurement location ML(2), and
generating an estimate of the location of the first radio transmitter and an estimate of the location of the second radio transmitter based on which pairwise combination of:
(1) the first radio transmitter at the first candidate location CL(1) and the second radio transmitter at the first candidate location CL(1), and
(2) the first radio transmitter at the first candidate location CL(1) and the second radio transmitter at the second candidate location CL(2), and
(3) the first radio transmitter at the second candidate location CL(2) and the second radio transmitter at the first candidate location CL(1), and
(4) the first radio transmitter at the second candidate location CL(2) and the second radio transmitter at the second candidate location CL(2)
is more consistent with the first measurement value MV(1,1), the second measurement value MV(1,2), the third measurement value MV(2,1), the fourth measurement value MV(2,2), the first candidate prediction of the total path loss A(1,1), the second candidate prediction of the total path loss A(1,2), the third candidate prediction of the total path loss A(2,1), and the fourth candidate prediction of the total path loss A(2,2).

2. The method of claim 1 further comprising:
receiving a fifth measurement value that is evidence of the power of the first radio signal at a wireless terminal; and
generating an estimate of the location of the wireless terminal based on:
(i) the fifth measurement value, and
(ii) the estimate of the location of the first radio transmitter.

3. The method of claim 2 further comprising:
transmitting the estimate of the location of the wireless terminal to the wireless terminal for use in a location-based application.

4. The method of claim 2 further comprising:
transmitting the estimate of the location of the wireless terminal to a remote data processing system for use in a location-based application.

5. The method of claim 2 further comprising:
using the estimate of the location of the wireless terminal in a location-based application.

6. The method of claim 1 further comprising:
generating an estimate of the transmission power of the first radio transmitter and an estimate of the transmission power of the second radio transmitter based on which pairwise combination of:
(1) the first radio transmitter at the first candidate location CL(1) and the second radio transmitter at the first candidate location CL(1), and
(2) the first radio transmitter at the first candidate location CL(1) and the second radio transmitter at the second candidate location CL(2), and
(3) the first radio transmitter at the second candidate location CL(2) and the second radio transmitter at the first candidate location CL(1), and
(4) the first radio transmitter at the second candidate location CL(2) and the second radio transmitter at the second candidate location CL(2)
is more consistent with the first measurement value MV(1,1), the second measurement value MV(1,2), the third measurement value MV(2,1), the fourth measurement value MV(2,2), the first candidate prediction of the total path loss A(1,1), the second candidate prediction of the total path loss A(1,2), the third candidate prediction of the total path loss A(2,1), and the fourth candidate prediction of the total path loss A(2,2); and
receiving a fifth measurement value that is evidence of the power of the first radio signal at a wireless terminal; and
generating an estimate of the location of the wireless terminal based on:
(i) the fifth measurement value, and
(ii) the estimate of the location of the first radio transmitter, and
(iii) the estimate of the transmission power of the first radio transmitter.

7. The method of claim 1 further comprising:
generating an estimate of the location of a footprint of a building based on which pairwise combination of:
(1) the first radio transmitter at the first candidate location CL(1) and the second radio transmitter at the first candidate location CL(1), and
(2) the first radio transmitter at the first candidate location CL(1) and the second radio transmitter at the second candidate location CL(2), and (3) the first radio transmitter at the second candidate location CL(2) and the second radio transmitter at the first candidate location CL(1), and (4) the first radio transmitter at the second candidate location CL(2) and the second radio transmitter at the second candidate location CL(2)

is more consistent with the first measurement value MV(1,1), the second measurement value MV(1,2), the third measurement value MV(2,1), the fourth measurement value MV(2,2), the first candidate prediction of the total path loss A(1,1), the second candidate prediction of the total path loss A(1,2), the third candidate prediction of the total path loss A(2,1), and the fourth candidate prediction of the total path loss A(2,2); and receiving a fifth measurement value that is evidence of the power of the first radio signal at a wireless terminal; and generating an estimate of the location of the wireless terminal based on:

(i) the fifth measurement value, and (ii) the estimate of the location of the first radio transmitter, and (iii) the estimate of the location of the footprint of the building.

8. The method of claim 1 further comprising:

generating an estimate of the location of an architectural feature of a building based on which pairwise combination of:

(1) the first radio transmitter at the first candidate location CL(1) and the second radio transmitter at the first candidate location CL(1), and (2) the first radio transmitter at the first candidate location CL(1) and the second radio transmitter at the second candidate location CL(2), and (3) the first radio transmitter at the second candidate location CL(2) and the second radio transmitter at the first candidate location CL(1), and (4) the first radio transmitter at the second candidate location CL(2) and the second radio transmitter at the second candidate location CL(2)

is more consistent with the first measurement value MV(1,1), the second measurement value MV(1,2), the third measurement value MV(2,1), the fourth measurement value MV(2,2), the first candidate prediction of the total path loss A(1,1), the second candidate prediction of the total path loss A(1,2), the third candidate prediction of the total path loss A(2,1), and the fourth candidate prediction of the total path loss A(2,2); and receiving a fifth measurement value that is evidence of the power of the first radio signal at a wireless terminal; and generating an estimate of the location of the wireless terminal based on:

(i) the fifth measurement value, and (ii) the estimate of the location of the first radio transmitter, and (iii) the estimate of the location of the architectural feature of the building.

9. A method comprising:

receiving:

(i) a first measurement value MV(1,1) of a first radio signal as received at a first measurement location ML(1), wherein the first radio signal is transmitted by a first radio transmitter and is characterized by a wavelength $\lambda$, and (ii) a second measurement value MV(1,2) of the first radio signal as received at a second measurement location ML(2), wherein second measurement location is different than the first measurement location, and (iii) a third measurement value MV(2,1) of a second radio signal as received at the first measurement location ML(1), wherein the second radio signal is transmitted by a second radio transmitter and is characterized by the wavelength $\lambda$, and (iv) a fourth measurement value MV(2,2) of the second radio signal as received at the second measurement location ML(2); and generating:

(i) a first candidate location CL(1) for the first radio transmitter and for the second radio transmitter, and (ii) a second candidate location CL(2) for the first radio transmitter and for the second radio transmitter;

generating:

(i) a first candidate prediction of the total path loss A(1,1) for a hypothetical radio signal from the first candidate location CL(1) to the first measurement location ML(1), wherein the hypothetical radio signal is characterized by the wavelength $\lambda$, and (ii) a second candidate prediction of the total path loss A(1,2) for the hypothetical radio signal from the first candidate location CL(1) to the second measurement location ML(2), and (iii) a third candidate prediction of the total path loss A(2,1) for the hypothetical radio signal from the second candidate location CL(2) to the first measurement location ML(1), and (iv) a fourth candidate prediction of the total path loss A(2,2) for the hypothetical radio signal from the second candidate location CL(2) to the second measurement location ML(2), and generating an estimate of the excess path loss in a portion of a geographic region based on which pairwise combination of:

(1) the first radio transmitter at the first candidate location CL(1) and the second radio transmitter at the first candidate location CL(1), and (2) the first radio transmitter at the first candidate location CL(1) and the second radio transmitter at the second candidate location CL(2), and (3) the first radio transmitter at the second candidate location CL(2) and the second radio transmitter at the first candidate location CL(1), and (4) the first radio transmitter at the second candidate location CL(2) and the second radio transmitter at the second candidate location CL(2)

is more consistent with the first measurement value MV(1,1), the second measurement value MV(1,2), the third measurement value MV(2,1), the fourth measurement value MV(2,2), the first candidate prediction of the total path loss A(1,1), the second candidate prediction of the total path loss A(1,2), the third candidate prediction of the total path loss A(2,1), and the fourth candidate prediction of the total path loss A(2,2).

10. The method of claim 9 further comprising:

receiving a fifth measurement value that is evidence of the power of the first radio signal at a wireless terminal; and generating an estimate of the location of the wireless terminal based on:

(i) the fifth measurement value, and (ii) the estimate of the excess path loss in the portion of the geographic region.

11. The method of claim 10 further comprising:
transmitting the estimate of the location of the wireless terminal to the wireless terminal for use in a location-based application.

12. The method of claim 10 further comprising:
transmitting the estimate of the location of the wireless terminal to a remote data processing system for use in a location-based application.

13. The method of claim 10 further comprising:
using the estimate of the location of the wireless terminal in a location-based application.

14. A method comprising:
receiving:
  (i) a first measurement value MV(1,1) of a first radio signal as received at a first measurement location ML(1), wherein the first radio signal is transmitted by a first radio transmitter and is characterized by a wavelength λ, and
  (ii) a second measurement value MV(1,2) of the first radio signal as received at a second measurement location ML(2), wherein second measurement location is different than the first measurement location, and
  (iii) a third measurement value MV(2,1) of a second radio signal as received at the first measurement location ML(1), wherein the second radio signal is transmitted by a second radio transmitter and is characterized by the wavelength λ, and
  (iv) a fourth measurement value MV(2,2) of the second radio signal as received at the second measurement location ML(2); and
generating:
  (i) a first candidate location CL(1) for the first radio transmitter and for the second radio transmitter, and
  (ii) a second candidate location CL(2) for the first radio transmitter and for the second radio transmitter;
generating:
  (i) a first candidate prediction of the total path loss A(1,1) for a hypothetical radio signal from the first candidate location CL(1) to the first measurement location ML(1), wherein the hypothetical radio signal is characterized by the wavelength λ, and
  (ii) a second candidate prediction of the total path loss A(1,2) for the hypothetical radio signal from the first candidate location CL(1) to the second measurement location ML(2), and
  (iii) a third candidate prediction of the total path loss A(2,1) for the hypothetical radio signal from the second candidate location CL(2) to the first measurement location ML(1), and
  (iv) a fourth candidate prediction of the total path loss A(2,2) for the hypothetical radio signal from the second candidate location CL(2) to the second measurement location ML(2), and
generating an estimate of the transmission power of the first radio transmitter and an estimate of the transmission power of the second radio transmitter based on which pairwise combination of:
  (1) the first radio transmitter at the first candidate location CL(1) and the second radio transmitter at the first candidate location CL(1), and
  (2) the first radio transmitter at the first candidate location CL(1) and the second radio transmitter at the second candidate location CL(2), and
  (3) the first radio transmitter at the second candidate location CL(2) and the second radio transmitter at the first candidate location CL(1), and
  (4) the first radio transmitter at the second candidate location CL(2) and the second radio transmitter at the second candidate location CL(2)
is more consistent with the first measurement value MV(1,1), the second measurement value MV(1,2), the third measurement value MV(2,1), the fourth measurement value MV(2,2), the first candidate prediction of the total path loss A(1,1), the second candidate prediction of the total path loss A(1,2), the third candidate prediction of the total path loss A(2,1), and the fourth candidate prediction of the total path loss A(2,2).

15. The method of claim 14 further comprising:
receiving a fifth measurement value that is evidence of the power of the first radio signal at a wireless terminal and a fourth measurement value that is evidence of the power of the second radio signal at the wireless terminal; and
generating an estimate of the location of the wireless terminal based on:
  (i) the fifth measurement value, and
  (ii) the sixth measurement value, and
  (iii) the estimate of the transmission power of the first radio transmitter, and
  (iv) the estimate of the transmission power of the second radio transmitter.

16. The method of claim 15 further comprising:
transmitting the estimate of the location of the wireless terminal to the wireless terminal for use in a location-based application.

17. The method of claim 15 further comprising:
transmitting the estimate of the location of the wireless terminal to a remote data processing system for use in a location-based application.

18. The method of claim 15 further comprising:
using the estimate of the location of the wireless terminal in a location-based application.

* * * * *